(12) United States Patent
Taki et al.

(10) Patent No.: US 9,965,777 B2
(45) Date of Patent: May 8, 2018

(54) ADVERTISEMENT DISTRIBUTION MANAGEMENT APPARATUS AND ADVERTISEMENT DISTRIBUTION MANAGEMENT METHOD

(71) Applicant: YAHOO JAPAN CORPORATION, Tokyo (JP)

(72) Inventors: Ririse Taki, Tokyo (JP); Shouichi Iiduka, Tokyo (JP); Akira Satou, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 480 days.

(21) Appl. No.: 14/154,669

(22) Filed: Jan. 14, 2014

(65) Prior Publication Data

US 2014/0222584 A1    Aug. 7, 2014

(30) Foreign Application Priority Data

Feb. 5, 2013    (JP) ................................. 2013-020607

(51) Int. Cl.
*G06Q 30/02*    (2012.01)

(52) U.S. Cl.
CPC ..... *G06Q 30/0269* (2013.01); *G06Q 30/0241* (2013.01)

(58) Field of Classification Search
CPC ........... G06Q 30/0261; G06Q 30/0255; G06Q 30/0201
USPC .......................................................... 705/14
See application file for complete search history.

(56) References Cited

U.S. PATENT DOCUMENTS

| | | | | |
|---|---|---|---|---|
| 5,835,061 | A * | 11/1998 | Stewart | H04L 29/06 342/457 |
| 6,990,462 | B1 * | 1/2006 | Wilcox | G06Q 30/02 705/14.61 |
| 2003/0130887 | A1 * | 7/2003 | Nathaniel | G06Q 10/02 705/14.73 |

(Continued)

FOREIGN PATENT DOCUMENTS

| | | |
|---|---|---|
| JP | A-2002-203119 | 7/2002 |
| JP | A-2002-288322 | 10/2002 |

(Continued)

OTHER PUBLICATIONS

Sep. 16, 2014 Office Action issued in Japanese Patent Application No. 2013-020607.

(Continued)

*Primary Examiner* — Vincent M Cao
(74) *Attorney, Agent, or Firm* — Oliff PLC

(57) ABSTRACT

An advertisement distribution management apparatus according to an embodiment includes a detection unit, a storage unit, and an acceptance unit. The detection unit detects information on a wireless terminal which exists in a communication area of a wireless LAN access point and which satisfies a predetermined condition. The storage unit stores information on the wireless terminal detected by the detection unit and attribute information set to the wireless LAN access point in association with each other. The acceptance unit accepts an order request of an advertisement distribution that specifies the attribute information on the basis of the information on the wireless terminal stored in the storage unit in association with the specified attribute information.

18 Claims, 12 Drawing Sheets

(56) References Cited

U.S. PATENT DOCUMENTS

| | | | |
|---|---|---|---|
| 2006/0080171 A1* | 4/2006 | Jardins | G06Q 10/087 705/14.68 |
| 2007/0027751 A1* | 2/2007 | Carson | G06F 17/2785 705/14.46 |
| 2008/0040216 A1* | 2/2008 | Dellovo | G06Q 10/0637 705/14.44 |
| 2009/0228327 A1* | 9/2009 | Roy | G06Q 30/02 705/14.66 |
| 2010/0191558 A1* | 7/2010 | Chickering | G06Q 10/0631 705/7.29 |
| 2010/0285818 A1* | 11/2010 | Crawford | G06Q 10/0637 455/456.3 |
| 2012/0203638 A1* | 8/2012 | Kaplan | G06Q 30/02 705/14.64 |

FOREIGN PATENT DOCUMENTS

| | | |
|---|---|---|
| JP | 2003-122993 A | 4/2003 |
| JP | 2003-134546 A | 5/2003 |
| JP | 2003-281179 A | 10/2003 |
| JP | 2005-218028 A | 8/2005 |
| JP | 2009-188922 A | 8/2009 |
| JP | 2012-049963 A | 3/2012 |
| JP | 5129404 B1 | 1/2013 |

OTHER PUBLICATIONS

Sep. 6, 2016 Office Action issued in Japanese Patent Application No. 2015-053974.

Nov. 15, 2016 Office Action issued in Japanese Patent Application No. 2015-053975.

\* cited by examiner

| ADVER-TISEMENT ID | USER ATTRIBUTE | DISTRIBUTION PERIOD | THE NUMBER OF DISTRIBUTIONS | ADVERTISING INFORMATION |
|---|---|---|---|---|
| O1 | CONVENIENCE STORE | JANUARY 1, 2013 TO JANUARY 31, 2013 | 100 | BANNER ADVERTISING Ya |
| O2 | B STATION | JANUARY 1, 2013 TO JANUARY 31, 2013 | 200 | MOVING IMAGE ADVERTISING Yb |
| O3 | BOOK STORE | JANUARY 1, 2013 TO JANUARY 31, 2013 | 150 | BANNER ADVERTISING Yc |
| O4 | CONVENIENCE STORE | JANUARY 1, 2013 TO JANUARY 31, 2013 | 20 | BANNER ADVERTISING Yd |
| ⋮ | ⋮ | ⋮ | ⋮ | ⋮ |

FIG.7

| USER ID | TERMI-NAL ID | USER ATTRIBUTE ||||||||
| | | DEMOGRAPHIC ATTRIBUTE || PSYCHOGRAPHIC ATTRIBUTE || AP ATTRIBUTE ||||
| | | GENDER | AGE | ... | CAR | COS-METICS | ... | CONVEN-IENCE STORE | B STATION | BOOK STORE | ... |
|---|---|---|---|---|---|---|---|---|---|---|---|
| U1 | T1 | 2 | 21 | ... | 1 | 0 | ... | 1 | 0 | 0 | ... |
| U2 | T2 | 1 | 36 | ... | 0 | 1 | ... | 0 | 1 | 0 | ... |
| U3 | T3 | 2 | 45 | ... | 0 | 0 | ... | 0 | 0 | 1 | ... |
| ⋮ | ⋮ | ⋮ | ⋮ | ⋮ | ⋮ | ⋮ | ⋮ | ⋮ | ⋮ | ⋮ | ⋮ |

FIG.8

| DATE AND TIME | USER ID |
|---|---|
| 12/1/2013 6:11:05 | U1 |
| 12/1/2013 6:11:06 | U29 |
| 12/1/2013 6:12:08 | U82 |
| 12/1/2013 6:12:44 | U1 |
| 12/1/2013 6:13:02 | U2 |
| 12/1/2013 6:13:21 | U3 |
| ⋮ | ⋮ |

FIG.9

| SPACE ID | AP-ID | TERMINAL ID | CHECK-IN TIME | CHECK-OUT TIME | RADIO WAVE INTENSITY [dBm] |
|---|---|---|---|---|---|
| R1 | E1 | T1 | 12/1/2013 12:41:41 | — | -40 |
|  |  | T2 | 12/1/2013 12:40:06 | — | -55 |
|  |  | ⋮ | ⋮ | ⋮ | ⋮ |
| R2 | E2 | T3 | 12/1/2013 12:39:08 | — | -45 |
|  |  | T4 | 12/1/2013 12:28:50 | — | -35 |
|  |  | ⋮ | ⋮ | ⋮ | ⋮ |
|  | ⋮ | ⋮ | ⋮ | ⋮ | ⋮ |
|  | Em | Tn-2 | 12/1/2013 12:38:18 | — | -45 |
|  |  | Tn-1 | 12/1/2013 12:40:53 | — | -30 |
|  |  | Tn | 12/1/2013 12:41:19 | — | -40 |
|  |  | ⋮ | ⋮ | ⋮ | ⋮ |
| R3 | E2 | T3 | 12/1/2013 12:39:08 | — | -45 |
|  |  | T4 | 12/1/2013 12:28:50 | — | -35 |
|  |  | ⋮ | ⋮ | ⋮ | ⋮ |
| ⋮ | ⋮ | ⋮ | ⋮ | ⋮ | ⋮ |

FIG.10

| SPACE ID | AP-ID | SPACE NAME | SPACE LOCATION | AP ATTRIBUTE | ATTRIBUTE SETTING CONDITION | | |
|---|---|---|---|---|---|---|---|
|  |  |  |  |  | RADIO WAVE INTENSITY THRESHOLD [dBm] | STAY TIME THRESHOLD [MINUTE(S)] | THRESHOLD OF THE NUMBER OF TIMES |
| R1 | E1 | A STORE | CHUO WARD, TOKYO… | CONVENIENCE STORE | -40 OR MORE | 2 OR MORE | 10 TIMES/ MONTH |
| R2 | E2 | B STATION | CHIYODA WARD, TOKYO… | B STATION | -45 OR MORE | 5 OR MORE | 30 TIMES/ MONTH |
|  | ⋮ |  |  |  |  |  |  |
|  | Em |  |  |  |  |  |  |
| R3 | E2 | C STORE | CHIYODA WARD, TOKYO… | BOOK STORE | -35 OR MORE | 5 OR MORE | 5 TIMES/ MONTH |
| ⋮ | ⋮ | ⋮ | ⋮ | ⋮ | ⋮ | ⋮ | ⋮ |

FIG.11

| AP ATTRIBUTE | | | ATTRIBUTE SETTING CONDITION | | | | |
|---|---|---|---|---|---|---|---|
| AP TYPE | TIME | REGION | INTENSITY THRESHOLD | TIME THRESHOLD | THRESHOLD OF THE NUMBER OF TIMES | TIME THRESHOLD | REGION THRESHOLD |
| CONVENIENCE STORE | MORNING | CHUO WARD, CHIYODA WARD | -40 dBm OR MORE | 5 TO 10 MINUTES | 10 TIMES/ MONTH | 6:00 TO 9:00 | CHUO WARD, CHIYODA WARD |
| | DAYTIME | | | | | 11:00 TO 14:00 | |
| | NIGHT | | | | | 18:00 TO 21:00 | |
| COMMUTING TO WORKS/ SCHOOLS | MORNING | CHIYODA WARD | -40 dBm OR MORE | 2 TO 10 MINUTES | 5 TIMES/ WEEK | 7:00 TO 10:00 | B STATION, D STATION, E STATION |
| COMMUTING TO WORKS/ SCHOOLS | MORNING | SHINJUKU⇒ ROPPONGI | -40 dBm OR MORE | 2 TO 10 MINUTES | 5 TIMES/ WEEK | 7:00 TO 10:00 | SHINJUKU, ROPPONGI |
| : | : | : | : | : | : | : | : |

FIG.12

| DISTRI-BUTION TARGET ID | ALLO-CATION STATE | OBJECT TO BE ALLO-CATED | USER ATTRIBUTE |||||||||
|---|---|---|---|---|---|---|---|---|---|---|---|
| | | | DEMOGRAPHIC ATTRIBUTE || | PSYCHOGRAPHIC ATTRIBUTE || | AP ATTRIBUTE ||| |
| | | | GEN-DER | AGE | ... | CAR | COS-METICS | ... | CONVEN-IENCE STORE | B STA-TION | BOOK STORE | ... |
| F1 | 0 | 0 | 1 | 54 | ... | 0 | 1 | ... | 0 | 1 | 1 | ... |
| F2 | 1 | O2 | 2 | 22 | ... | 0 | 0 | ... | 0 | 1 | 0 | ... |
| F3 | 0 | 0 | 2 | 32 | ... | 1 | 0 | ... | 1 | 0 | 0 | ... |
| F4 | 0 | 0 | 1 | 21 | ... | 1 | 0 | ... | 1 | 0 | 0 | ... |
| F5 | 1 | O3 | 2 | 43 | ... | 0 | 0 | ... | 0 | 0 | 1 | ... |
| F6 | 0 | 0 | 1 | 18 | ... | 1 | 1 | ... | 1 | 1 | 1 | ... |
| F7 | 1 | O3 | 1 | 38 | ... | 0 | 1 | ... | 0 | 1 | 1 | ... |
| F8 | 1 | O1 | 1 | 27 | ... | 1 | 0 | ... | 1 | 0 | 0 | ... |
| F9 | 1 | O3 | 2 | 61 | ... | 0 | 1 | ... | 0 | 1 | 1 | ... |
| F10 | 1 | O1 | 1 | 52 | ... | 1 | 0 | ... | 1 | 0 | 0 | ... |
| ... | ... | ... | ... | ... | ... | ... | ... | ... | ... | ... | ... | ... |

FIG.13

| AP ATTRIBUTE | DISTRIBUTION TARGET USER INFORMATION ||| DISTRIBUTION UNIT PRICE (YEN/ONCE) | ADVERTISING EFFECT (CTR) |
|---|---|---|---|---|---|
| | TOTAL NUMBER | ALLOCATED | NON-ALLOCATED (STOCK) | | |
| CONVENIENCE STORE | 2000 | 350 | 1650 | 10 | 0.01 |
| B STATION | 10000 | 3000 | 7000 | 8 | 0.005 |
| BOOK STORE | 1200 | 550 | 650 | 12 | 0.02 |
| ... | ... | ... | ... | ... | ... |

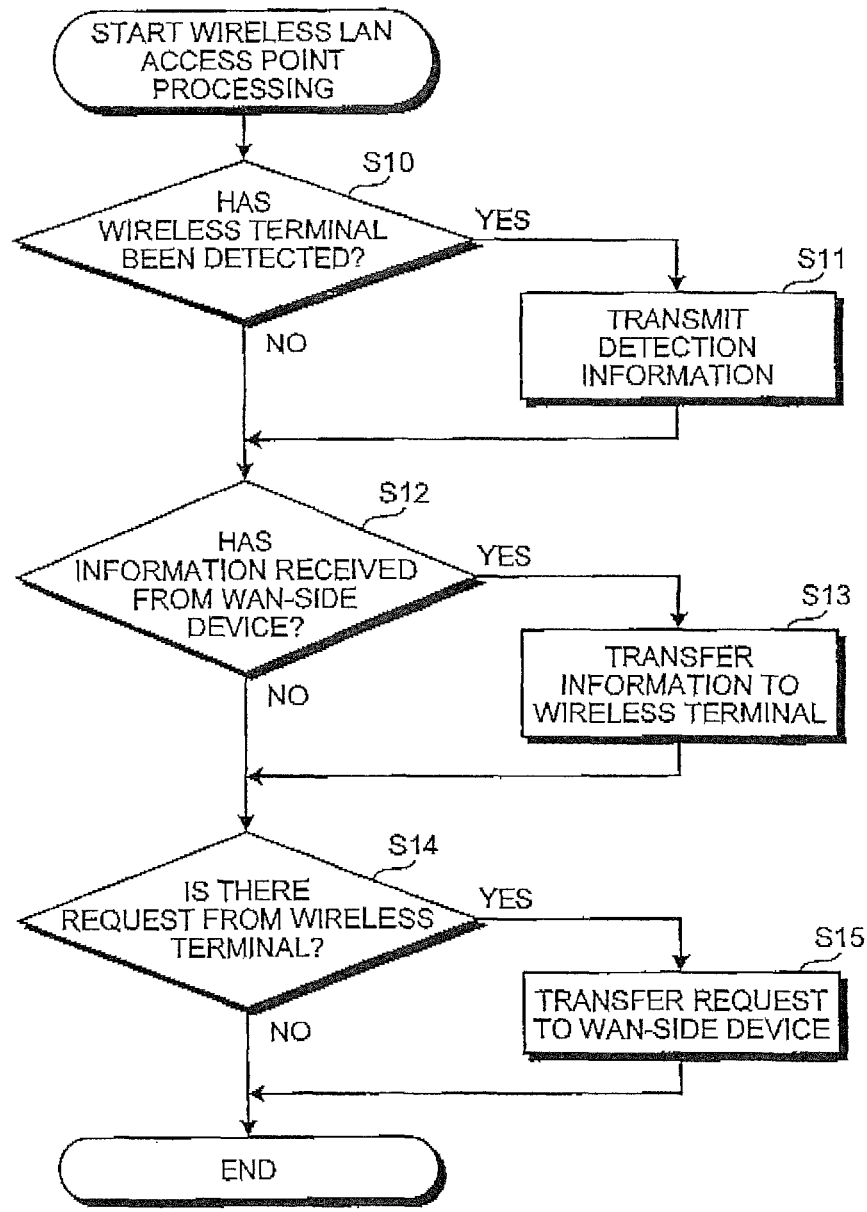

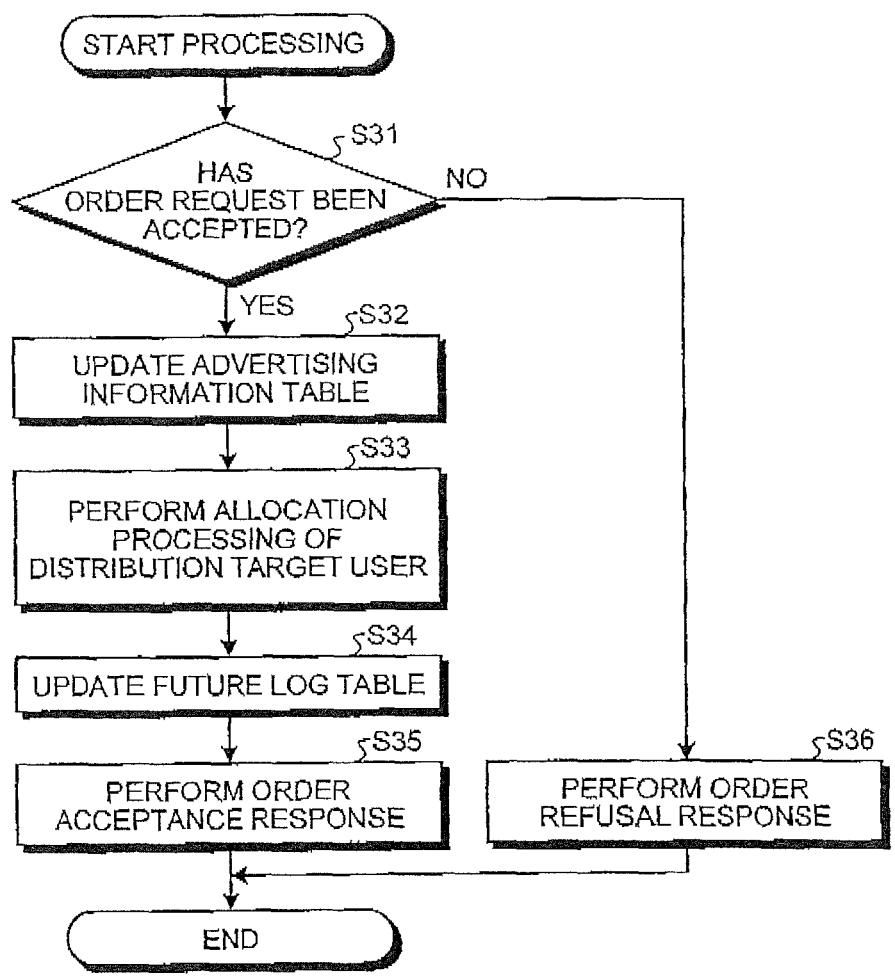

ADVERTISEMENT DISTRIBUTION MANAGEMENT APPARATUS AND ADVERTISEMENT DISTRIBUTION MANAGEMENT METHOD

CROSS-REFERENCE TO RELATED APPLICATIONS

The present application claims priority to and incorporates by reference the entire contents of Japanese Patent Application No. 2013-020607 filed in Japan on Feb. 5, 2013.

BACKGROUND OF THE INVENTION

1. Field of the Invention

The present invention relates to an advertisement distribution management apparatus and an advertisement distribution management method.

2. Description of the Related Art

In recent years, with the rapid spread of a network such as the Internet, an advertisement distribution through the network has been actively performed. As one form of the advertisement distribution, display advertising in which an advertisement is display in a fixed space within a page that is to be distributed as an advertisement using an image and a video is known.

In the display advertisement, an advertisement distribution is performed to users having user attributes (gender, age, and the like) specified by an advertiser, so that an effective advertisement distribution is performed (for example, see Japanese Patent Application Laid-open No. 2002-203119).

Further, with respect to an order request of an advertisement distribution from an advertiser, when there are distribution stocks that satisfy distribution conditions such as a user attribute and the number of distributions specified in the order request, the distribution stocks are allocated and the order request is accepted (for example, see Japanese Patent Application Laid-open No. 2002-288322).

However, in the invention described in Japanese Patent Application Laid-open No. 2002-288322, distribution stocks in which demographic attributes such as gender, age, and an occupation are set as the user attributes are set, and an advertisement distribution corresponding to a demand of the advertiser may not be able to be accepted.

SUMMARY OF THE INVENTION

According to an exemplary embodiment, an advertisement distribution management apparatus includes a detection unit, a storage unit, and an acceptance unit. The detection unit detects a wireless terminal which exists in a communication area of a wireless LAN access point and satisfies a predetermined condition. The storage unit stores information on the wireless terminal detected by the detection unit and attribute information set to the wireless LAN access point in association with each other. The acceptance unit accepts an order request of an advertisement distribution that specifies the attribute information on the basis of the information on the wireless terminal stored in the storage unit in association with the specified attribute information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of a user information table stored in a user information DB;

FIG. 8 is a diagram illustrating an example of an access log table stored in a past log DB;

FIG. 9 is a diagram illustrating an example of a terminal information table stored in a space information DB;

FIG. 10 is a diagram illustrating an example of a space information table stored in a space information DB;

FIG. 11 is a diagram illustrating another example of an AP attribute and an attribute setting condition in the space information table;

FIG. 12 is a diagram illustrating an example of a future log table stored in a future log DB;

FIG. 13 is a diagram illustrating an attribute information table stored in a space information DB;

FIG. 14 is a flowchart of information processing in a wireless LAN access point;

FIG. 16 is a diagram illustrating a flowchart of order request acceptance processing illustrated in FIG. 15.

DETAILED DESCRIPTION OF THE PREFERRED EMBODIMENTS

Hereinafter, an embodiment to implement an advertisement distribution management apparatus and an advertisement distribution management method according to the present application (hereinafter, referred to as "embodiment") will be described in detail with reference to the drawings. Note that the advertisement distribution management apparatus and the advertisement distribution management method according to the present application are not limited by the embodiment.

1. Configuration of Advertisement Distribution Management System

Figure 1:
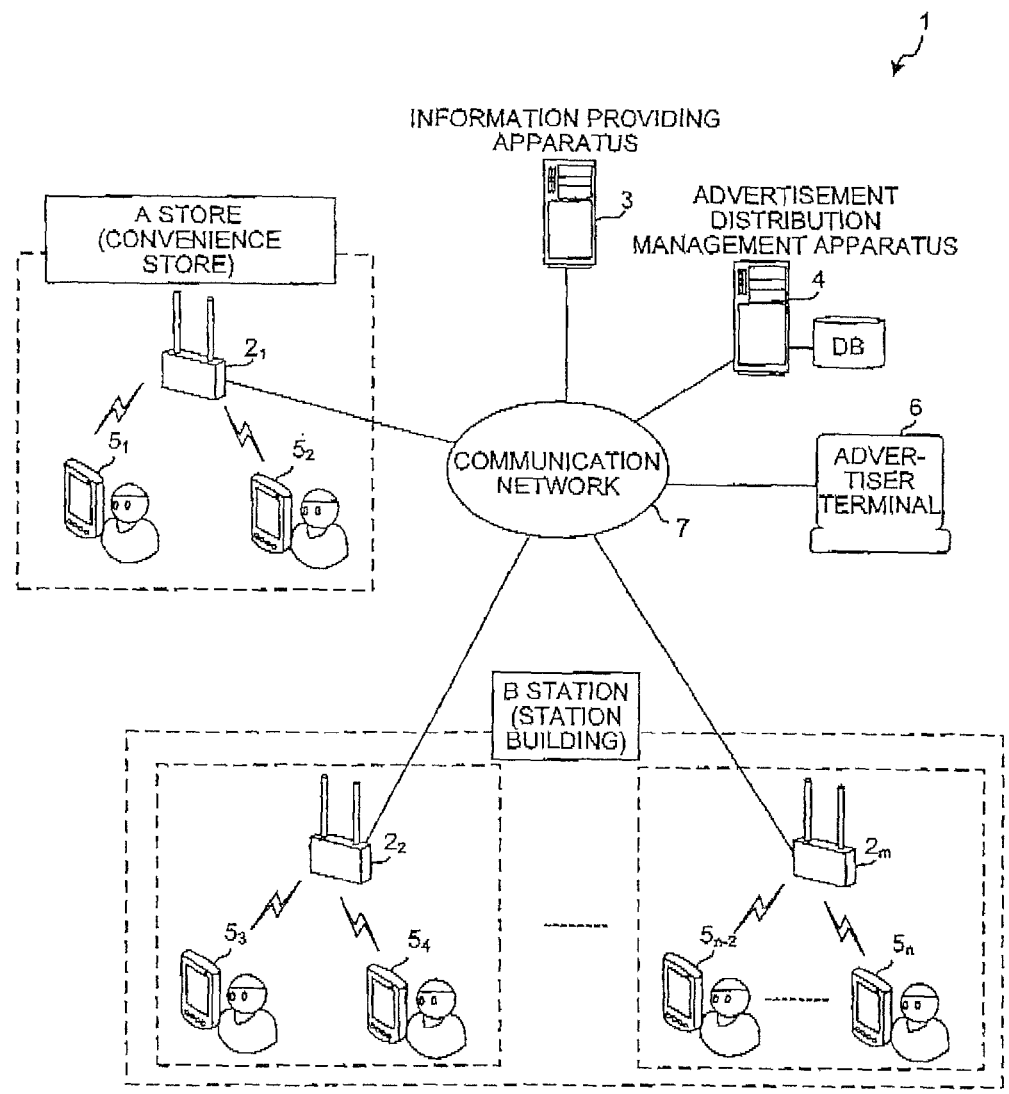
FIG. 1 is a diagram illustrating a configuration example of an advertisement distribution management system according to an embodiment.

First, a configuration of an advertisement distribution management system according to an embodiment will be described. FIG. 1 is a diagram illustrating a configuration example of an advertisement distribution management system according to an embodiment, and an order request of an advertisement distribution with attribute information on the basis of an actual behavior of a user can be accepted by an advertisement distribution management system 1.

As illustrated in FIG. 1, the advertisement distribution management system 1 according to the embodiment includes a wireless local area network (LAN) access points $2_1$ to $2_m$ (hereinafter, may be collectively referred to as wireless LAN access point 2), an information distribution apparatus 3, and an advertisement distribution management apparatus 4. The wireless LAN access point 2, the information distribution apparatus 3, and the advertisement distribution management apparatus 4 are mutually connected through a communication network 7 in a communication enabled manner. The communication network 7 is, for example, a wide area network (WAN) such as the Internet.

The advertisement distribution management system 1 sets a user attribute as an attribute of the user of wireless terminals $5_1$ to $5_n$ (hereinafter, may be collectively referred to as wireless terminal 5) on the basis of information detected in the wireless LAN access point 2, and accepts an order request of an advertisement distribution from an advertiser terminal 6 to the set user attribute through the communication network 7. The advertiser terminal 6 is a terminal device of the advertiser who wishes an advertisement distribution.

The wireless terminal 5 is a mobile telephone in which a wireless LAN communication function is incorporated, and can access the information distribution apparatus 3 and the advertisement distribution management apparatus 4 through the wireless LAN access point 2 in a communication area of the wireless LAN access point 2. Note that the wireless terminal 5 can access the information distribution apparatus 3 and the advertisement distribution management apparatus 4 connected to the communication network 7 through a wireless WAN base station (not illustrated) such as a mobile phone base station or the like.

The wireless LAN access point 2 includes a wireless LAN communication unit, and can mutually perform wireless communication between the wireless LAN access point 2 and the wireless terminal 5 by the wireless LAN communication unit. The wireless LAN access point 2 covers, as a communication area a station, a shopping street, and an event site where concerts and sports are performed, in addition to commercial spaces such as a store, a restaurant, a beauty salon, a barber, a hospital, a hotel, a movie theater, and a complex leisure facility.

In the example illustrated in FIG. 1, the wireless LAN access point $2_1$ is installed in an A store as a convenience store, and the wireless LAN access points $2_2$ to $2_m$ are installed in a B station. Further, other wireless LAN access points 2 are installed in other locations, but they are omitted in the example illustrated in FIG. 1.

When having been accessed by the wireless terminal 5, the information distribution apparatus 3 transmits a page that is to be distributed as an advertisement (hereinafter, described as an advertisement distribution target page) such as a web page to the wireless terminal 5, for example. The an advertisement distribution target page includes a uniform resource locator (URL) of advertising information, and the wireless terminal 5 requests the advertising information to the advertisement distribution management apparatus 4 on the basis of the URL. When having received a request of the advertising information from the wireless terminal 5, the advertisement distribution management apparatus 4 transmits, to the wireless terminal 5, the advertising information corresponding to the user attribute that the user (hereinafter, may be described as terminal user) of the wireless terminal 5 has.

The advertisement distribution management apparatus 4 sets the user attribute of the user of the wireless terminal 5 on the basis of information detected in the wireless-LAN access point 2, and accepts an order request of an advertisement distribution from the advertiser terminal 6 to the set user attribute. The advertisement distribution management apparatus 4 executes processing from an acceptance of the order of the advertisement distribution to a distribution by performing processing of allocating one or more distribution stocks for the order requests (hereinafter, referred to as distribution stock) to the accepted order request and processing of executing a distribution of the advertising information specified by the order request.

2. Advertisement Distribution Management Method

Figure 2:
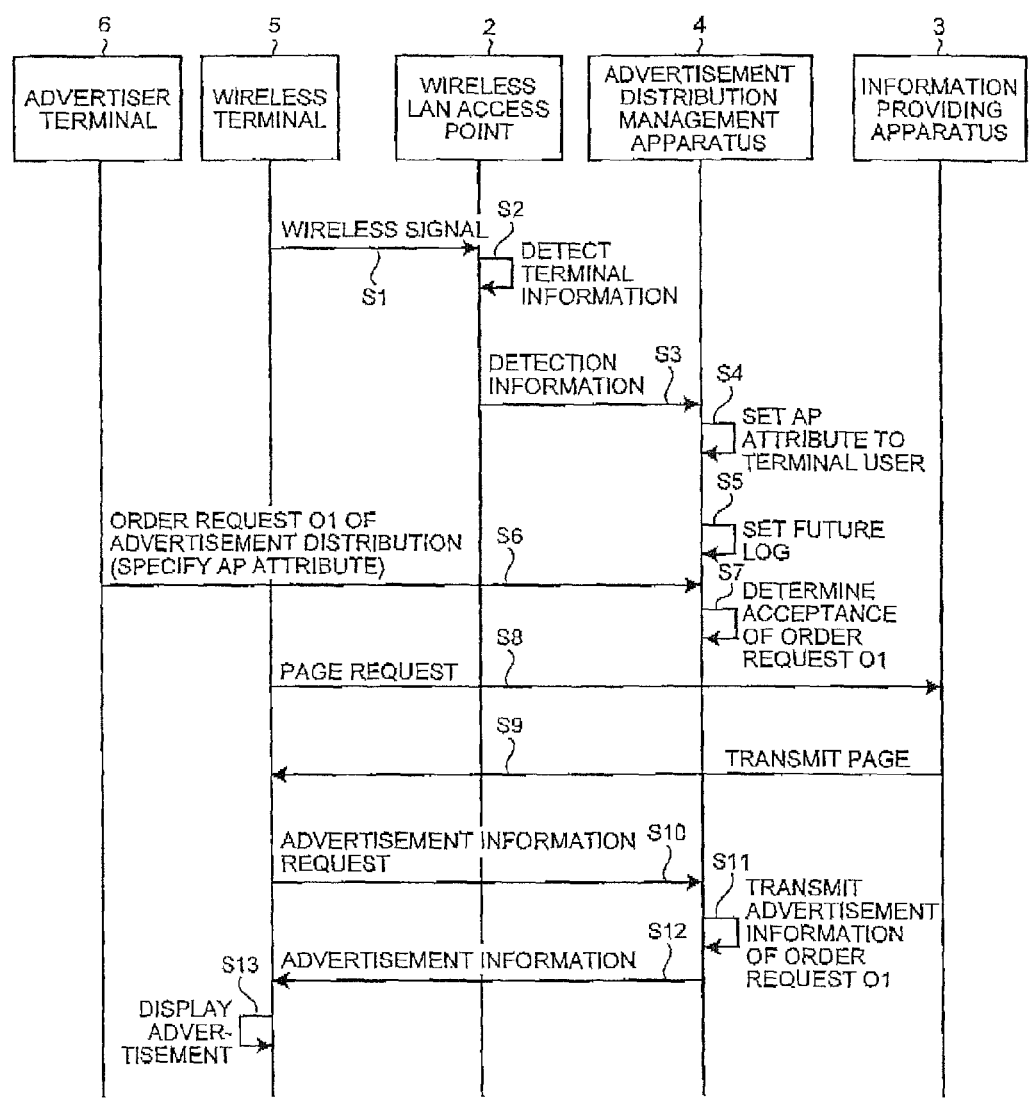
FIG. 2 is an explanatory diagram of an advertisement distribution management method according to an embodiment.

Next, an example of an advertisement distribution management method by the advertisement distribution management system 1 will be described. FIG. 2 is an explanatory diagram of an advertisement distribution management method according to an embodiment.

As illustrated in FIG. 2, the wireless terminal 5 existing in a communication area of the wireless LAN access point 2 (hereinafter, described as an AP communication area) transmits a wireless signal to the wireless LAN access point 2 (step S1). The wireless LAN access point 2 detects a terminal ID and a radio wave intensity information on the wireless terminal 5 as terminal information on the basis of the wireless signal transmitted from the wireless terminal 5 (step S2).

The terminal ID is, for example, a media access control address (MAC address) of a wireless LAN communication unit of the wireless terminal 5, and the radio wave intensity information is, for example, information on the radio wave intensity of the wireless signal transmitted from the wireless terminal 5 and received in the wireless LAN access point 2. The wireless LAN access point 2 transmits the terminal information including the terminal ID and the radio wave intensity information on the wireless terminal 5 to the advertisement distribution management apparatus 4 as detection information (step S3).

The advertisement distribution management apparatus 4 sets a user attribute of the user of the wireless terminal 5 on the basis of the detection information transmitted from the wireless LAN access point 2 (step S4). In the processing, the advertisement distribution management apparatus 4 detects information on the wireless terminal 5 existing in the AP communication and satisfying a predetermined condition on the basis of the detected information transmitted from the wireless LAN access point 2.

The advertisement distribution management apparatus 4 then sets an AP attribute as the user attribute of the user of the wireless terminal 5 existing in the AP communication area and satisfying the predetermined condition. The AP attribute is attribute information set in units of wireless LAN access points 2 or in two or more groups of wireless LAN access points 2. The advertisement distribution management apparatus 4 stores the information on the wireless terminal 5 (the terminal ID or a user ID of the user) and the AP attribute in an internal DB in association with each other.

For example, when the wireless terminal $5_1$ exists in the communication area of the wireless LAN access point $2_1$ and satisfies the predetermined condition, a "convenience store" that is a format of installation location of the wireless LAN access point $2_1$ is set to the user of the wireless terminal $5_1$ as the AP attribute, for example.

When the wireless terminal $5_3$ exists in the communication area of the wireless LAN access point $2_2$ and satisfies the predetermined condition, a "B station" as the installation location of the wireless LAN access point $2_2$ is set to the user of the wireless terminal $5_3$ as the AP attribute, for example.

The advertisement distribution management apparatus 4 predicts information including a user attribute of a distribution target user that is to be a destination of an advertisement distribution in a predetermined future period, and sets a prediction result thereof to an internal storage unit as a future log (step S5). In such processing, the advertisement distribution management apparatus 4 predicts what kind of user attribute (including AP attribute) users who access the information distribution apparatus 3 in future five days have, and how frequently the users access the information distribution apparatus 3, and sets a prediction result in the internal storage unit as a future log.

For example, assume that an average of frequency of an access to the information distribution apparatus 3 by the user of the wireless terminal is once per day, and the number of users of the wireless terminal 5 set as the AP attribute "convenience store" is "1000" in one day. In this case, the advertisement distribution management apparatus 4 predicts, for example, the distribution target users having the AP attribute "convenience store" are "5000" in the future five days.

Following that, when an order request O1 in which the AP attribute is a specified user attribute is transmitted from the advertiser terminal 6 (step S6), the advertisement distribution management apparatus 4 determines whether accepting the order request O1 (step S7). The order request O1 includes information on advertising information, a user attribute, the number of distributions, and a distribution period.

For example, when the order request O1 is an order request in which the AP attribute to be specified is a "convenience store", the distribution period is future five days, and the number of distributions is "5000", the advertisement distribution management apparatus 4 accepts the order request O1 when the number of distribution target users that have the AP attribute "convenience store" in the future five days is "5000".

Following that, in the distribution period specified in the order request O1, when a page request is transmitted from the wireless terminal 5 to the information distribution apparatus 3 (step S8), for example, the advertisement distribution management apparatus 4 transmits a an advertisement distribution target page such as a web page to the wireless terminal 5 (step S9). The an advertisement distribution target page included a URL of the advertising information, and the wireless terminal 5 requests the advertising information to the advertisement distribution management apparatus 4 on the basis of the URL (step S10).

When having received the request of the advertising information from the wireless terminal 5, the advertisement distribution management apparatus 4 transmits the advertising information corresponding to the user attribute that the user of the wireless terminal 5 has to the wireless terminal 5 (steps S11 and S12). For example, when the wireless terminal 5 that has transmitted the request of the advertising information has the user attribute of the AP attribute "convenience store", the advertisement distribution management apparatus 4 transmits the advertising information on the order request O1 that specifies the AP attribute "convenience store" to the wireless terminal 5. The wireless terminal 5 displays the advertising information transmitted from the advertisement distribution management apparatus 4 in a display unit (step S13). Note that examples of the advertising information include, for example, two-dimensional content or three-dimensional content such as banner advertising, text advertising, or moving image advertising.

As described above, in the advertisement distribution management processing according to the embodiment, an order request of an advertisement distribution can be accepted using information according to an installation location of the wireless LAN access point 2 as an user attribute, and an attribute corresponding to an actual behavior of the user can be provided to the advertiser as a target. Accordingly, a new attribute different from an attribute according to a behavior of the user on the communication network 7 can be provided as a target and an attraction of the advertisement distribution service to the advertiser can be improved.

Hereinafter, the wireless LAN access point 2 and the advertisement distribution management apparatus 4 that configure the advertisement distribution management system 1 will be described in more detail.

3. Configuration of Wireless LAN Access Point 2

Figure 3:
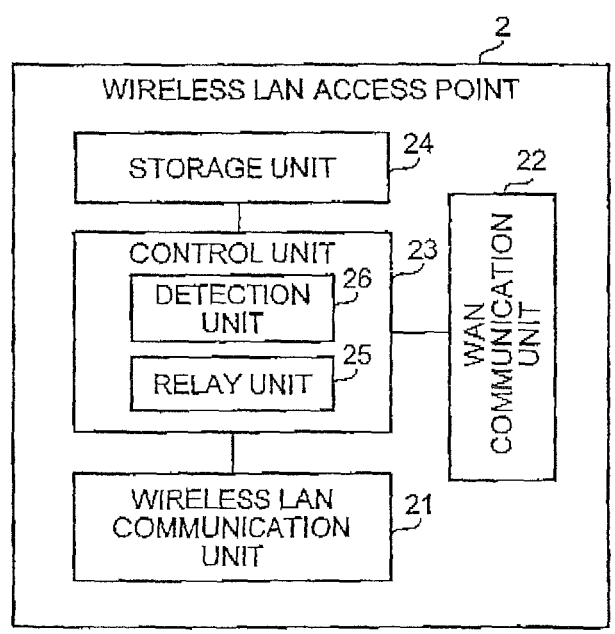
FIG. 3 is a diagram illustrating a configuration example of a wireless LAN access point.

First, a configuration of the wireless LAN access point 2 will be specifically described. FIG. 3 is a diagram illustrating a configuration example of the wireless LAN access point 2. As illustrated in FIG. 3, the wireless LAN access point 2 includes a wireless LAN communication unit 21, a WAN communication unit 22, a control unit 23, and a storage unit 24.

The wireless LAN communication unit 21 is installed such that a target space (for example, a space such as a restaurant and an event site) can be covered as a communication area. The wireless LAN communication unit 21 is a communication interface that performs wireless LAN communication, and transmits/receives information to/from the wireless terminal 5 in which the wireless LAN communication function is incorporated. Note that, as the wireless LAN, for example, there is a wireless LAN defined by IEEE802.11. However, the wireless LAN is not limited to the wireless LAN of the standard.

The WAN communication unit 22 is connected to the communication network 7, and transmits/receives information to/from the information distribution apparatus 3 and the advertisement distribution management apparatus 4 through the communication network 7. The WAN communication unit 22 is connected to the communication network 7 in a wired or wireless manner.

The control unit 23 includes a relay unit 25 that performs information relay processing and a detection unit 26 that performs detection processing of the wireless terminal 5, and realizes or executes a function or an action of information processing described below. Note that the internal configuration of the control unit 23 is not limited to the configuration, and may employ another configuration as long as the configuration performs the information processing described below.

The relay unit 25 transmits information acquired from the wireless terminal 5 through the wireless LAN communication unit 21 to the information distribution apparatus 3 and the advertisement distribution management apparatus 4 from the WAN communication unit 22, and transmits information acquired from the information distribution apparatus 3 and the advertisement distribution management apparatus 4 through the WAN communication unit 22 to the wireless terminal 5 from the wireless LAN communication unit 21.

Note that the information transmission from the wireless LAN access point 2 to the information distribution apparatus 3 and the advertisement distribution management apparatus 4 is performed, for example, by packet communication in which an address of the communication network 7 to be allocated to the wireless LAN access point 2 is a transmission source address, and an address of the communication network 7 to be allocated to the information distribution apparatus 3 and the advertisement distribution management apparatus 4 is a transmission destination address. The address of the communication network 7 is, for example, an address to be allocated to the WAN communication unit 22.

Figure 4A:
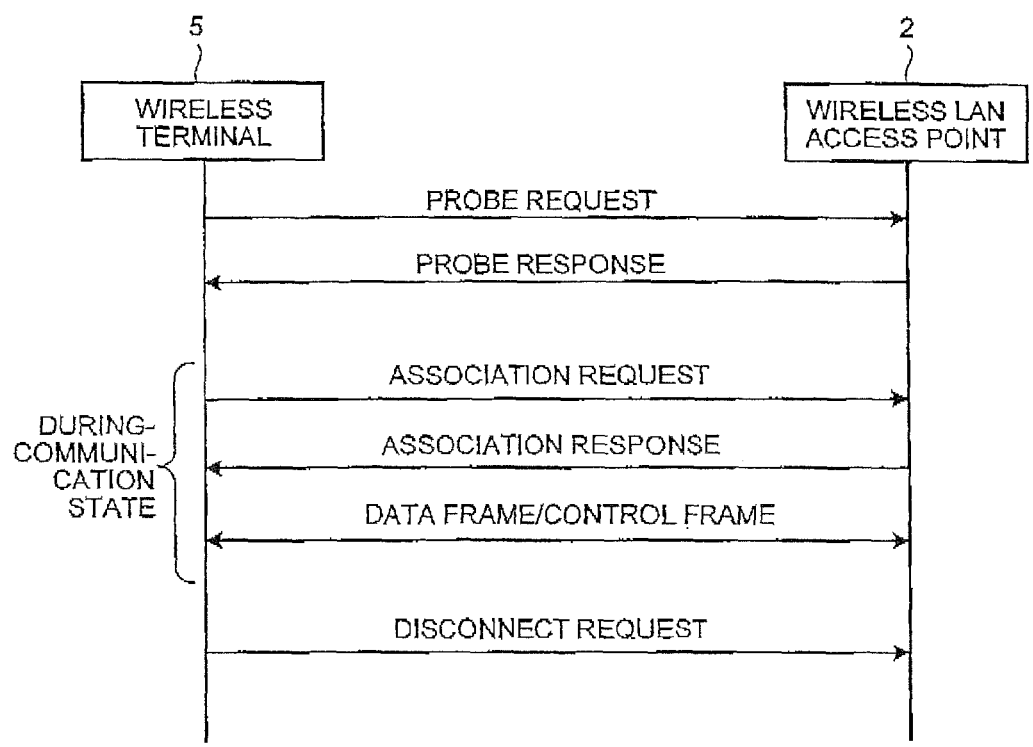
FIGS. 4A and 4B are diagrams illustrating sequences of establishing a session between a wireless LAN access point and a wireless terminal.
Figure 4B:
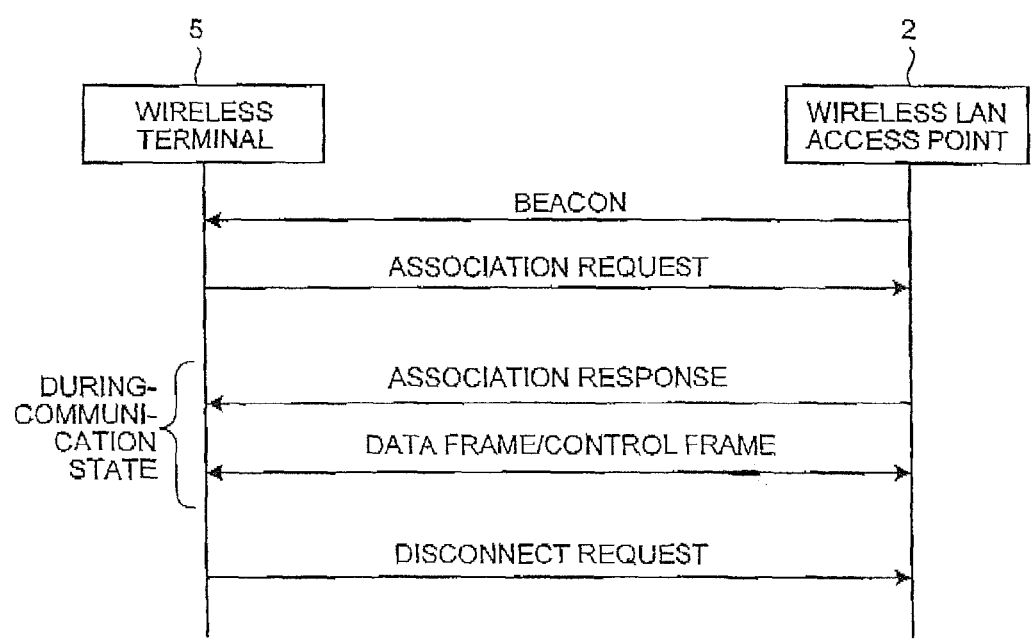

The detection unit 26 detects existence of the wireless terminal 5 by acquiring a wireless packet transmitted from the wireless terminal 5 through the wireless LAN communication unit 21. FIGS. 4A and 4B are diagrams illustrating sequences of establishing a session between the wireless LAN access point 2 and the wireless terminal 5.

In the example illustrated in FIG. 4A, a wireless packet called probe request is periodically transmitted from the wireless terminal 5 by broadcast or the like, and the detection unit 26 detects the existence of the wireless terminal 5 by acquiring the wireless packet through the wireless LAN communication unit 21.

The probe request includes a basic service set identifier (BSSID), and when the BSSID coincides with a BSSID of the wireless LAN communication unit 21, the detection unit 26 transmits a probe response to the wireless terminal 5. The wireless terminal 5 that has received the probe response transfers to a during-communication state in a case where automatic communication is set.

The transfer to the during-communication state is, as illustrated in FIG. 4A, performed by establishment of a session by an association request and an association response, and following that, the wireless terminal 5 and the wireless LAN communication unit 21 transmit/receive a data frame and a control frame to/from each other to enter the during-communication state.

Note that, when a disconnect request is given from the wireless terminal 5, or when the wireless packet cannot be transmitted/received between the wireless terminal 5 and the wireless LAN communication unit 21, the during-communication state is cancelled. When the detection unit 26 transfers to the during-communication state, the detection unit 26 is in a state of repeatedly receiving a wireless packet and detecting the existence of the wireless terminal 5 until the during-communication state is cancelled.

Further, the detection unit 26 broadcasts a wireless packet called beacon to the wireless terminal 5 to which the wireless packet is not periodically transmitted, through the wireless LAN communication unit 21 as illustrated in FIG. 4B, for example, and detects the existence of the wireless terminal 5 by receiving an association request with respect to the beacon.

The detection unit 26 that has received the association request establishes a session by transmitting an association response to the wireless terminal 5, and causes the wireless terminal 5 and the wireless LAN communication unit 21 to be in the during-communication state. Note that the during-communication state is cancelled when a disconnect request is given from the wireless terminal 5 or when the wireless packet cannot be transmitted/received between the wireless terminal 5 and the wireless LAN communication unit 21. When having transferred to the during-communication state in the case of the example illustrated in FIG. 4A, the detection unit 26 is in a state of repeatedly receiving a wireless packet until the during-communication state is cancelled and detecting the existence of the wireless terminal 5.

When having determined to have detected the wireless terminal 5, for example, the detection unit 26 transmits detection information to the information distribution apparatus 3 through the WAN communication unit 22. To be specific, the detection unit 26 extracts a terminal ID included in the wireless packet transmitted from the wireless terminal 5, and detects the radio wave intensity.

The terminal ID is, for example, a MAC address of the wireless LAN communication unit of the wireless terminal 5, and is added to the wireless packet and transmitted from the wireless terminal 5. The radio wave intensity is radio wave intensity of a wireless signal received by the wireless LAN access point 2. Note that the radio wave intensity may be a received signal strength indication (RSSI) acquired in the wireless terminal 5. In this case, the wireless signal including information on the radio wave intensity is transmitted from the wireless terminal 5 to the wireless LAN access point 2.

The detection unit 26 transmits information including an AP-ID in addition to the terminal ID of the wireless terminal 5 and information on the radio wave intensity to the information distribution apparatus 3 as the detection information. As the AP-ID, for example, a network address of the communication network 7 to be allocated to the WAN communication unit 22 can be used.

Further, the detection unit 26 can count a stay time of the wireless terminal 5 in the AP communication area, and in this case, the detection unit 26 can include the stay time of the wireless terminal 5 in the detection information and transmits the detection information to the information distribution apparatus 3.

4. Configuration of Advertisement Distribution Management Apparatus 4

Figures 5, 6:
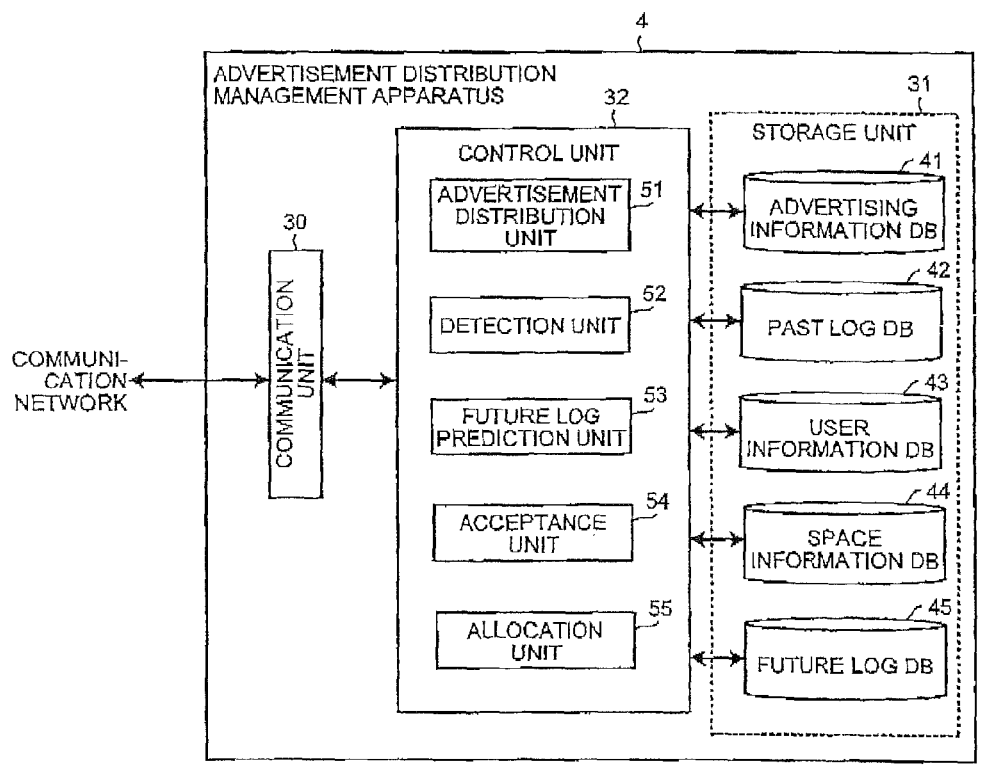
FIG. 5 is a diagram illustrating a configuration example of an advertisement distribution management apparatus according to an embodiment.
FIG. 6 is a diagram illustrating an example of an advertising information table stored in an advertising information DB.

FIG. 5 is a diagram illustrating a configuration example of the advertisement distribution management apparatus 4 according to an embodiment. As illustrated in FIG. 5, the advertisement distribution management apparatus 4 includes a communication unit 30, a storage unit 31, and a control unit 32. Further, the storage unit 31 includes an advertising information DB 41, a past log DB 42, a user information DB 43, a space information DB 44, and a future log DB 45, and the control unit 32 includes an advertisement distribution unit 51, a detection unit 52, a future log prediction unit 53, an acceptance unit 54, and an allocation unit 55.

The communication unit 30 is an interface such as a network interface card (NIC) or the like. The control unit 32 transmits/receives various types of information to/from the wireless LAN access point 2 and the advertiser terminal 6 through the communication unit 30 and the communication network 7.

The advertising information DB 41, the past log DB 42, the user information DB 43, the space information DB 44, and the future log DB 45 are, for example, hard disks, random access memories (RAM), semiconductor memory elements such as flash memories, or storage devices such as optical disks, or the like. Note that the advertising information DB 41, the past log DB 42, the user information DB 43, the space information DB 44, and the future log DB 45 may be a single DB.

The control unit 32 is realized by, for example, an integrated circuit such as an application specific integrated circuit (ASIC) or a field programmable gate array (FPGA). Further, the control unit 32 functions as the advertisement distribution unit 51, the detection unit 52, the future log prediction unit 53, the acceptance unit 54, and the allocation unit 55 by a program stored in an internal storage device being executed by a central processing unit (CPU) or a micro processing unit (MPU) using the RAM as a work area. Note that the configuration of the control unit 32 is not limited to the configuration, and another configuration may be employed as long as the configuration performs information processing described below.

Advertisement Distribution Unit 51

When having received a distribution request of advertising information from the wireless terminal 5, the advertisement distribution unit 51 acquires, from an advertising information table in the advertising information DB 41, advertising information according to a user attribute that the user of the wireless terminal 5 has, and transmits, from the communication unit 30, the acquired advertising information to the wireless terminal 5 as a requestor of the distribution.

FIG. 6 is a diagram illustrating an example of the advertising information table stored in the advertising information DB 41. As illustrated in FIG. 6, the advertising information table is information in which a "user attribute", a "distribution period", "the number of distributions", and "advertising information" are associated with each other for each "advertisement ID".

The "advertisement ID" is identification information to be allocated for each order request by the acceptance unit 54. The "user attribute" is a user attribute specified by an order request, and the "distribution period" is a distribution period of the advertising information specified by the order request, and "the number of distributions" is the number of distributions of the advertising information specified by the order request. Further, the "advertising information" is advertising information specified by the order request.

For example, the order request of an advertisement ID "O1" indicates the user attribute of a distribution target is a "convenience store", the distribution period of the advertising information is "Jan. 1, 2013 to Jan. 31, 2013", the number of distributions of the advertising information is "100 times", and the advertising information is "banner advertising Ya". Note that, when the number of distributions of the advertising information exceeds "100 times" even within the distribution period of the advertising information, the distribution processing of the advertising information to the order request ends.

When the user of the wireless terminal 5 that has requested distribution of the advertising information has the user attribute "convenience store", the advertisement distribution unit 51 acquires the advertising information "banner advertising Ya" of the advertisement ID "O1" from the advertising information table in the advertising information DB 41, and transmits the advertising information to the wireless terminal 5 as the requestor of the distribution.

The user attribute that the user of the wireless terminal 5 has is determined on the basis of the user information table in the user information DB 43. FIG. 7 is a diagram illustrating an example of the user information table stored in the user information DB 43. As illustrated in FIG. 7, the user information table is information in which a "terminal ID" and a "user attribute" are associated with each other for each "user ID". The "user attribute" includes a "demographic attribute", "psychographic attribute", and an "AP attribute".

The "user ID" is identification information for identifying a user who uses the wireless terminal 5. The "user ID" corresponds to user identification information set to a HyperHext Transfer Protocol cookie (HTTP cookie) transmitted/received between the advertisement distribution management apparatus 4 and the wireless terminal 5, for example.

The "terminal ID" is a MAC address of the wireless LAN communication unit of the wireless terminal 5, for example, and is set to the user information table associated with the user ID of the user of the wireless terminal 5.

The "demographic attribute" indicates demographic attribute information on a user. The "demographic attribute" is classified into attribute sections such as a "gender" and an "age" of users, for example. "1" is stored in the "gender" illustrated in FIG. 7 when the user is a female, and "2" is stored when the use is a male. Further, an age of the user is stored in the "age". Note that the "demographic attribute" is not limited to the example of the attribute sections illustrated in FIG. 7, and may include various attribute sections such as an occupation, a family structure, an annual income, an address, a user's hometown, and an academic background of the user.

The "psychographic attribute" is information indicating user's values, a life style, a personality, and a liking. The "psychographic attribute" is classified into attribute sections such as a "car" and "cosmetics", for example. In the example illustrated in FIG. 7, "1" is stored when the liking of the user is relatively high and "0" is stored in other cases for each attribute section. Further, the "psychographic attribute" is not limited to the example of the attribute section illustrated in FIG. 7, and may include various attribute sections such as economy, politics, baseball, football, other sports, sweets, a personal computer, a major appliance, and furniture.

The "AP attribute" is attribute information set in units of wireless LAN access points 2 or in two or more groups of wireless LAN access points 2, as described above. For example, "1" is set to the section of the "convenience store" with respect to the user of the wireless terminal 5 existing in a communication area of the wireless LAN access point $2_1$ and satisfying the predetermined condition. Further, "1" is set to the section of the "B station" with respect to the user of the wireless terminal 5 existing in the communication areas of the wireless LAN access points $2_2$ to $2_m$ and satisfying the predetermined condition.

Note that the AP attribute in units of wireless LAN access points 2 is an example of first attribute information, and the AP attribute in two or more groups of wireless LAN access points 2 is an example of second attribute information. For example, the AP attribute "convenience store" is the first attribute information, and the AP attribute "B station" is the second attribute information.

When a distribution request of advertising information is given from a wireless terminal 5 owned by a user of a user ID "U1" illustrated in FIG. 7, for example, the advertisement distribution unit 51 determines the user attributes of the user of the wireless terminal 5 are a "male", a "21 year-old", a "car", the "convenience store", and the like. Further, for example, a distribution request of advertising information is given from a wireless terminal 5 owned by a user of a user ID "O2" illustrated in FIG. 7, the advertisement distribution unit 51 determines the user attributes of the user of the wireless terminal 5 are a "female", a "36 year-old", the "cosmetics", the "B station", and the like.

Further, the advertisement distribution unit 51 sets the user IDs of the users of the wireless terminals 5 that has requested the distribution of the advertising information to an access log table in the past log DB 42. FIG. 8 is a diagram illustrating an example of the access log table stored in the past log DB 42.

As illustrated in FIG. 8, the access log table is a table to which information on a date and time at which the user of the wireless terminal 5 has requested the distribution of the advertising information to the advertisement distribution management apparatus 4 and the user ID are set in association with each other (hereinafter, may be described as past log). The advertisement distribution unit 51 updates the access log table every time a distribution request of advertising information is given from the wireless terminal 5.

Detection Unit 52

The detection unit 52 detects a wireless terminal 5 that exists in the communication area of the wireless LAN access point 2 and satisfies the predetermined condition. The detection unit 52 causes the user of the wireless terminal 5 that satisfies the predetermined condition (hereinafter, described as attribute setting condition) and the AP attribute to be associated with each other on the basis of detection information transmitted from the wireless LAN access point 2.

When having received the detection information from the wireless LAN access point 2, the detection unit 52 sets the detection information received to a terminal information table in the space information DB 44. FIG. 9 is a diagram illustrating an example of the terminal information table stored in the space information DB 44.

As illustrated in FIG. 9, the terminal information table is information in which one or more "AP-IDs" are associated with each "space ID", and a "terminal ID", a "check-in time", a "check-out time", "radio wave intensity", and the like are associated with each other for each "AP-ID".

The "space ID" is identification information on the installation location of the wireless LAN access point 2, and is set in units of wireless LAN access points 2 or in two or more groups of wireless LAN access points 2.

The "AP-ID" is identification information on the wireless LAN access point 2 installed in a space of the corresponding "space ID", and is a network address of the communication network 7 to be allocated to the WAN communication unit 22 of the wireless LAN access point 2, for example. The example illustrated in FIG. 9 indicates the wireless LAN access point $2_1$ of an AP-ID "E1" is installed in a space of a space ID "R1", and the wireless LAN access points $2_2$ to $2_m$ of AP-IDs "E2" to "Em" are set to a space of a space ID "R2".

The "terminal ID" is a terminal ID of the wireless terminal 5 existing in a corresponding AP communication area. For example, the example of FIG. 9 illustrates wireless terminals 5 of terminal IDs "T1" and "T2" exist in the communication area of the wireless LAN access point $2_1$ of an AP-ID "R1".

The "radio wave intensity" is information on a radio wave intensity of the wireless terminal 5 existing in the AP communication area. While the example in FIG. 9 illustrates information on latest radio wave intensity corresponding to each terminal ID, for the purpose of convenience, the information on the radio wave intensity and an average value thereof from when the wireless terminal 5 entered the AP communication area (hereinafter, described as check-in) are set to the terminal information table. Further, the example of FIG. 9 illustrates the unit of the radio wave intensity by "dBm". However, the radio wave intensity can be set by other units.

When having received the detection information from the wireless LAN access point 2, the detection unit 52 sets the terminal ID and the radio wave intensity information included in the detection information to the terminal information table in association with the "AP-ID" included in the detection information.

The "check-in time" is an entrance time of the wireless terminal 5 to the AP communication area. A stay time of the wireless terminal 5 in the AP communication area can be detected by comparison of the entrance time and a current time.

The "check-out time" is a time at which the wireless terminal 5 that entered the AP communication area has exited from the AP communication area afterwards. In the example illustrated in FIG. 9, the information on the wireless terminal 5 that has exited from the AP communication area is not included. When the wireless terminal 5 that entered the AP communication area has exited from the AP communication area, the detection unit 52 sets the exit time to the terminal information table as a check-out time. For example, the detection unit 52 detects a time at which a predetermined time has elapsed since not having received the radio wave intensity information on the wireless terminal 5 that entered the AP communication area as the "check-out time" of the wireless terminal 5.

Note that a set of the "terminal ID" to which the "check-out time" is set, the "check-in time", the "check-out time", and the "radio wave intensity" is managed by the detection unit 52 as history information.

The detection unit 52 determines the wireless terminal 5 in which the radio wave intensity is a predetermined threshold or more and the stay time is a predetermined value or more from among the wireless terminals 5 set to the terminal information table satisfies the attribute setting condition, and updates the user attribute corresponding to the user of the wireless terminal 5.

The detection unit 52 determines whether the radio wave intensity and the stay time of the wireless terminal 5 satisfy the attribute setting condition on the basis of a space information table in the space information DB 44. FIG. 10 is a diagram illustrating an example of the space information table stored in the space information DB 44.

As illustrated in FIG. 10, the space information table is information in which information such as one or more "AP-IDs", a "space name", a "space location", an "AP attribute", and an "attribute setting condition" are associated with each other for each "space ID".

The "attribute setting condition" is a condition for setting "1" to the "AP attribute" of the user information table, and the example illustrated in FIG. 10 includes a "radio wave intensity threshold", a "stay time threshold", and a "threshold of the number of times".

The "radio wave intensity threshold" is a threshold compared with the radio wave intensity of the wireless terminal 5, and when the radio wave intensity of the wireless terminal 5 is the "radio wave intensity threshold" or more, the detection unit 52 determines the wireless terminal 5 satisfies the condition of the radio wave intensity. The "stay time threshold" is a threshold compared with the stay time in the AP communication area of the wireless terminal 5, and when the stay time of the wireless terminal 5 is the "stay time threshold" or more, the detection unit 52 determines the wireless terminal 5 satisfies the condition of the stay time.

The "threshold of the number of times" is the number of times in which the wireless terminal 5 entered the corresponding AP communication area and satisfied the conditions of the radio wave intensity and the stay time. When the number of times in which the wireless terminal 5 entered the corresponding AP communication area and satisfied the conditions of the radio wave intensity and the stay time is the "threshold of the number of times" or more, the detection unit 52 sets a corresponding AP attribute as the user attribute of the user of the wireless terminal 5.

For example, the space information table is in a state illustrated in FIG. 10, and the radio wave intensity of the wireless terminal 5 when the user of the wireless terminal 5 comes to the A store is "−40 (dBm)" or more. In this case, when the number of times of coming to a store is a threshold of the number of times (10 times/month) or more, in which the user of the wireless terminal $5_1$ of the terminal ID "T1" came to the A store and the time for which the user stayed in the A store is the stay time threshold (two minutes), the detection unit 52 sets, in the space information table, "1" to the AP attribute "convenience store" with respect to the user ID "U1" corresponding to the wireless terminal $5_1$ as illustrated in FIG. 7.

Further, in the space information table illustrated in FIG. 10, the AP-IDs "E2" to "Em" are associated with the space ID "R2", and the communication areas of the wireless LAN access points 2 of the AP-IDs "E2" to "Em" are set to a single communication area (hereinafter, described as wide communication area). When the number of times of entering the wide communication area and satisfying the conditions of the radio wave intensity and the stay time is the "threshold of the number of times" or more, the detection unit 52 sets the AP attribute "B station".

For example, the space information table is in a state illustrated in FIG. 10 and the radio wave intensity of the wireless terminal 5 when the user of the wireless terminal 5 has entered the B station (for example, a station building) is −45 (dBm) or more. In this case, when the number of times of coming to a store is a threshold of the number of times (30 times/month) or more, in which the user of the wireless terminal $5_2$ of the terminal ID "T2" entered the B station and a time for which the user stayed in the store is a stay time threshold (five minutes), the detection unit 52 sets, in the space information table, "1" to the AP attribute "B station" with respect to the user ID "U2" corresponding to the wireless terminal $5_2$ as illustrated in FIG. 7.

Further, in the space information table illustrated in FIG. 10, the AP-ID "E2" is associated with a space ID "R3", and one AP communication area in the wide communication area is set. When the number of times of entering the AP communication area and satisfying the conditions of the radio wave intensity and the stay time is the "threshold of the number of times" or more, the detection unit 52 sets an AP attribute "book store".

For example, assume that the space information table is in a state illustrated in FIG. 10 and the radio wave intensity of the wireless terminal 5 when the user of the wireless terminal 5 has entered a C store is −35 (dBm) or more. In this case, when the number of times of coming to a store is the threshold of the number of times (five times/month) or more, in which the user of the wireless terminal $5_3$ of the terminal ID "T3" entered the C store and a time for which the user stayed in the store is a stay time threshold (five minutes), the detection unit 52 sets, in the space information table, "1" to the AP attribute "book store" with respect to the user ID "U3" corresponding to the wireless terminal $5_3$ as illustrated in FIG. 7.

Note that the attribute setting conditions set to the space information table illustrated in FIG. 10 are an example, and various attribute setting conditions can be set to the space information table. For example, when the radio wave intensity of the wireless terminal 5 when the user of the wireless terminal 5 passes the A store is −55 to −45 (dBm), and a time to pass the AP communication area is in a range of 5 to 15 seconds, an AP attribute of "frequently passing the convenience store" may be set.

Further, in the above description, as the attribute setting conditions, the "radio wave intensity threshold", the "stay time threshold", and the "threshold of the number of times" have been exemplarily described. However, a combination of the "radio wave intensity threshold" and the "threshold of the number of times" may be employed as the attribute setting condition, and a combination of the "stay time threshold" and the "threshold of the number of times" may be employed as the attribute setting condition.

Further, information on a time or a region may be employed as the attribute setting condition. FIG. 11 is a diagram illustrating another example of the AP attribute and the attribute setting condition in the space information table. As illustrated in FIG. 11, as "the AP attribute", information on an "AP type", a "time", and a "region" is set. Further, as the "attribute setting condition", an "intensity threshold (radio wave intensity threshold)", a "time threshold (stay time threshold)", a "threshold of the number of times", a "time threshold", and a "region threshold" are included.

In the example illustrated in FIG. 11, for example, as a "user who frequently uses convenience stores in Chuo ward and Chiyoda ward in a time period before work", the AP attributes in which the AP type "convenience store", the time "morning", and the region "Chuo ward and Chiyoda ward" are set. The AP attributes are subject to attribute setting conditions in which the number of times of entering AP communication areas of the convenience stores in Chuo ward and Chiyoda ward in a time period from six to nine o'clock is ten times/month, the radio wave intensity of the wireless terminal 5 when the wireless terminal 5 is in the AP communication areas is −40 (dBm) or more, and the stay time is five to ten minutes. Further, in the example illustrated in FIG. 11, attribute setting conditions about a "daytime" and a "night" are also set.

Further, in the example illustrated in FIG. 11, as a "user who uses a station in Chiyoda ward to go to work or school", the AP attributes in which the AP type "commuting to works/schools", the time "morning", and the region "Chiyoda ward" are set. The AP attributes are subject to attribute setting conditions in which the number of times of entrance to the AP communication areas of the B, D, and E stations as stations located in Chiyoda ward during the time period from seven to ten o'clock is five times or more per week, the radio wave intensity of the wireless terminal 5 when the wireless terminal 5 is in the AP communication areas is −40 (dBm) or more, and the stay time is two to ten minutes.

Further, in the example illustrated in FIG. 11, as a "user who uses a route from Shinjuku to Roppongi to go to work/school", the AP attributes in which the AP type "commuting to works/schools", the time "morning", the region "Shinjuku⇒ Roppongi" are set. The AP attributes are subject to attribute setting conditions in which the user enters both of the AP communication areas set to Shinjuku and to Roppongi during the time period from seven to ten o'clock, and the number of times is five times/week, the radio wave intensity of the wireless terminal 5 when the wireless terminal 5 is in the AP communication areas is −40 (dBm) or more, and the stay time is two to ten minutes.

As described above, not only the information related to the wireless LAN access point 2 (for example, the convenience store, the station, the book store, and the like) but also the information on the time and the region are set as the AP attributes, whereby the AP attributes can be subdivided. Accordingly, detailed demand from the advertiser can be appropriately handled while an effective advertisement distribution can be realized at the advertiser side, while customers can be increased due to improvement of the services, and the rise in revenue can be realized at the advertisement distribution service provider side.

Note that, in the examples illustrated in FIGS. 10 and 11, as the information related to the wireless LAN access point 2, a convenience store, a station, and a book store have been exemplarily described. However, as described above, various locations such as a shopping street, and an event site where concerts and sports are performed, in addition to commercial spaces such as a store, a restaurant, a beauty salon, a barber, a hospital, a hotel, a movie theater, and a complex leisure facility can be employed as the AP communication area and the wide communication area.

Future Log Prediction Unit 53

The future log prediction unit 53 determines a plurality of distribution target users that can be predicted as destinations of an advertisement distribution on the basis of the access log table stored in the past log DB 42, and sets the user information on the determined distribution target users to the future log table in the future log DB 45.

FIG. 12 is a diagram illustrating an example of the future log table stored in the future log DB 45. As illustrated in FIG. 12, in the future log table, the information related to the distribution target users predicted as the destinations of advertisement distributions in a predetermined future period (hereinafter, may be described as future log) is set. The future log table illustrated in FIG. 12 is information in which an "allocation state", an "object to be allocated", and a "user attribute" are associated with each other for each "distribution target ID". The "user attribute" includes a "psychographic attribute", a "demographic attribute", and an "AP attribute".

The "distribution target ID" is identification information to be allocated for each distribution target user predicted as a future destination of an advertisement distribution. The distribution target user is a virtual user different from the user set to the user information table in the user information DB 43.

The "object to be allocated" is an advertisement ID of an order request allocated to the distribution target user. For example, an order request O3 is allocated to the distribution target user of the distribution target ID of "F5". Note that "0" is set when an order request is not allocated.

The "allocation state" is information indicating whether a user is the distribution target user allocated to the order request. When the user is the distribution target user allocated to the order request, "1" is stored, and when the user is the distribution target user not allocated to the order request, "0" is stored.

The "psychographic attribute", the "demographic attribute", and the "AP attribute" are similar items to the user information table in the user information DB 43. Note that the user set to the user information table is estimated as the distribution target user, and the distribution target ID can be used as the user ID. In this case, information on the "psychographic attribute", the "demographic attribute", and the "AP attribute" can be obtained from the user information table on the basis of the user ID.

The future log prediction unit 53 can perform estimation of the distribution target user that is to be the destination of an advertisement distribution in a predetermined future period from an access log of the same period of one year ago and an access log of a preceding predetermined period, and the like. For example, the future log prediction unit 53 can estimate the user who has requested a distribution of advertising information during the preceding past one month as a distribution target user during the future one month.

Further, the future log prediction unit 53 determines a tendency of distribution target users that are the destinations of a future advertisement distribution by statistically processing a past log set to the access log table, and can predict a future log on the basis of a determination result. In this case, for example, the tendency of the distribution target users may be determined in consideration of variation information such as weather and temperature.

Note that, while the future log prediction unit 53 can set the predicted future log to the future log table, the future log prediction unit 53 can also set a future log acquired from an external device through the communication unit 30 to the future log table.

Acceptance Unit 54

The acceptance unit 54 determines whether accepting an order request from the advertiser terminal 6 on the basis of the future log set to the future log table, and performs order acceptance response to the advertiser terminal 6 when accepting the order request.

The order request from the advertiser terminal 6 includes specifying information such as the user attribute and the number of distributions, as described above. The acceptance unit 54 counts the number of distribution target users having a user attribute specified in a new order request from among distribution target users not to be allocated to an order request, and when a count result is the number of distributions or more, which is specified in the order request, the acceptance unit 54 accepts the new order request from the advertiser terminal 6. Note that the distribution target user in which "0" is set to the "allocation state" is a distribution target user not to be allocated to the order request (hereinafter, may be described as non-allocation user), and corresponds to a distribution stock.

For example, when having received an order request of an advertisement ID "O1" illustrated in FIG. 6, the acceptance unit 54 counts the number of non-allocation users in which "1" is set to the attribute section of the "convenience store" in the future log table. When the count result is "100" or more, the acceptance unit 54 accepts the order request from the advertiser terminal 6, and when the count result is less than "100", the acceptance unit 54 does not accept the order request from the advertiser terminal 6.

Further, for example, when having received an order request of an advertisement ID "O2" illustrated in FIG. 6, the acceptance unit 54 counts the number of non-allocation users in which "1" is set to the attribute section of the "B station" in the future log table. When the count result of "200" or more, the acceptance unit 54 accepts the order request from the advertiser terminal 6, and when the count result is less than "200", the acceptance unit 54 does not accept the order result from the advertiser terminal 6.

Note that the acceptance unit 54 can count a combination of two or more user attributes in which the frequency of being specified in an order request is a threshold or more as a single user attribute (hereinafter, may be described as combined user attribute). For example, when a combination of the "cosmetics" and the "B station" has a high frequency of being specified in order requests, the acceptance unit 54 can count the combination of the "cosmetics" and the "B station" as a single user attribute.

Information on the order request accepted by the acceptance unit 54 is set to the advertising information table in the advertising information DB 41, and the acceptance unit 54 can determine a combination of two or more user attributes in which the frequency of being specified in order requests is a threshold or more, on the basis of the advertising information table.

For example, the acceptance unit 54 obtains a total of the number of distributions specified in the past order requests as a first total value, and a total of the number of distributions specified in the past order requests for each combination of two or more user attributes as a second total value, on the basis of the advertising information table. The acceptance unit 54 then counts a combination of user attributes in which a ratio of the second total value to the first total value is a predetermined threshold or more as a single user attribute.

When the combination of the "cosmetics" and the "B station" has a high frequency of being specified in the order requests, and the future log table is in a state illustrated in FIG. 12, the user attribute of the distribution target user of the distribution target ID "F6" is a "cosmetics & B station" instead of the "cosmetics" or the "B station".

Note that a combination of two or more user attributes in which the frequency of being specified in the order requests is a threshold or more may be separately set to the user information DB 43 from an external device or the like instead of being determined by the acceptance unit 54.

When the number of non-allocation users is the predetermined value or less, or when the number of non-allocation users having a combined user attribute is the predetermined value or less, the acceptance unit 54 can divide the combined user attribute into a plurality of user attributes. Accordingly, the total number of user attributes can be increased, and as a result, while a possibility of acceptance of an order request that specifies a combined user attribute is decreased, a possibility of acceptance of other order requests can be increased.

Allocation Unit 55

The allocation unit 55 allocates a non-allocation user to an order request of a new advertisement distribution accepted in the acceptance unit 54. The allocation unit 55 can handle a combined user attribute as a single user attribute, similarly to the acceptance unit 54.

The distribution target user may have a plurality of effective AP attribute sections, as illustrated in FIG. 12. For example, three AP attributes: the "convenience store", the "B station", and the "book store" are set to the distribution target user in which the distribution target ID is "F6". Meanwhile, the AP attributes: the "convenience store", the "B station", the "book store", and the "convenience store" are respectively specified in the order requests of the advertisement IDs "O1" to "O4" illustrated in FIG. 6.

Therefore, the distribution target user in which the distribution target ID is "F6" can allocated to any of the order requests of the advertisement IDs "O1" to "O4". When there is a distribution target user that can be allocated to a plurality of order requests, the allocation unit 55 determines an order request to be allocated to the distribution target user on the basis of the set allocation condition.

As an allocation condition, for example, there are first to third conditions, and an order request to be allocated to a distribution target user is determined by any of or a combination of these conditions.

First condition: preferentially allocating an order request that specifies an attribute having a high distribution unit price Second condition: preferentially allocating an order request that specifies an attribute having a small number of non-allocation users Third condition: preferentially allocating an order request that specifies an attribute having a high advertising effect First, allocation processing by the first condition will be described. The allocation unit 55 preferentially allocates a non-allocation user to an order request that specifies an attribute having a high set distribution unit price. The attribute information table is stored in the future log DB 45, the allocation unit 55 allocates a non-allocation user to an order request on the basis of the attribute information table.

FIG. 13 is a diagram illustrating an example of the attribute information table stored in the space information DB 44. As illustrated in FIG. 13, the attribute information table is information in which "distribution target user information", a "distribution unit price", and an "advertising effect" are associated with each other for each "AP attribute".

In the "distribution target user information", a total number of distribution target users, the number of distribution target users that have been already allocated to order requests, and the number of non-allocation users are set. For example, the number of distribution target users having the AP attribute "convenience store" is "2000", and among them, the number of distribution target users that have been allocated to order requests is "350", and the number of non-allocation users is "1650".

Further, the "distribution unit price" is a value paid to an advertisement distribution service provider in an advertisement distribution to an order request, and is, for example, a value per advertisement distribution. In the example illustrated in FIG. 13, the distribution unit prices corresponding to the AP attribute "convenience store", the "B station", and the "book store" are "ten yen/once", "eight yen/once", and "twelve yen/once", respectively.

Therefore, the AP attribute "book store" is the highest distribution unit price, and the allocation unit 55 preferentially allocates the order-request of the advertisement ID "O3" that specifies the AP attribute "book store" to the distribution target user in which a distribution target ID is "F6".

Note that the allocation unit 55 may allocate the distribution target user to an order request selected on the basis of a relative ratio of the distribution unit price. For example, an average value of the distribution unit prices in the AP attributes: the "convenience store", the "B station", and the "book store" is "ten yen/advertisement distribution", and the relative ratios of the distribution unit prices in the AP attributes: the "convenience store", the "B station", and the "book store" are "1.0", "0.8", and "1.2".

The allocation unit 55 can allocate a non-allocation user to an order request with a probability according to the ratio. With this, a non-allocation user can be preferentially allocated to an order request that specifies an attribute in which the set distribution unit price is relatively high.

As described above, information on a value with respect to an advertisement distribution is set to the order request, and the allocation unit 55 allocates a non-allocation user allocatable to a plurality of order requests to the order request in which the distribution unit price is relatively high.

Since a non-allocation user having many user attributes can be allocated to many order requests, the non-allocation user is a valuable distribution stock, and such a valuable non-allocation user is allocated to an order request having a high distribution unit price. Accordingly, a distribution target user can be appropriately allocated to an order request.

Next, allocation processing by the second condition will be described. The allocation unit 55 preferentially allocates a non-allocation user to an order request that specifies an attribute having a small number of non-allocation users. As described above, the attribute information table illustrated in FIG. 13 is stored in the space information DB 44, and the allocation unit 55 allocates a non-allocation user to an order request on the basis of the attribute information table.

In the attribute information table illustrated in FIG. 13, the numbers of non-allocation users corresponding to the AP attributes: the "convenience store", the "B station", and the "book store" are "1650", "7000", and "650", respectively. Therefore, the AP attribute "book store" has a smallest number of non-allocation users, and the allocation unit 55 preferentially allocates, for example, the order request of the advertisement ID "O3" that specifies the AP attribute "book store" to the non-allocation user in which the distribution target ID is "F6". Note that the allocation unit 55 may allocate a non-allocation user to an order request selected on the basis of an inverse of relative ratio of the number of non-allocation users.

As described above, the allocation unit 55 allocates a non-allocation user that can be allocated to a plurality of order requests to an order request that specifies an attribute having a small number of non-allocation users. The non-allocation user having a large number of user attributes is a valuable distribution stock as described above, and to such a non-allocation user, an order request that specifies an attribute having a small number of non-allocation users is allocated. Accordingly, a non-allocation user can be appropriately allocated to an order request.

Next, allocation processing by the third condition will be described. The allocation unit 55 preferentially allocates a non-allocation user to an order request that specifies an attribute having a relatively high advertising effect. As described above, the attribute information table illustrated in FIG. 13 is stored in the space information DB 44, and the allocation unit 55 allocates a non-allocation user to an order request on the basis of the attribute information table.

The "advertising effect" illustrated in FIG. 13 is information indicating an advertising effect due to the advertising information when the advertising information is distributed to the user of the wireless terminal 5 having a corresponding AP attribute. For example, when the advertising information is the banner advertising, the advertising effect is a click-through rate (CTR). The CTR is a rate of the number of clicking the banner advertising to the number of distributions of the banner advertising. Note that the advertising effect is not limited to the CTR, and for example, a conversion rate (a rate of purchasing a corresponding product to the advertising information) may be employed.

In the attribute information table illustrated in FIG. 13, the advertising effects corresponding to the AP attributes: the "convenience store", the "B station", and the "book store" are "0.01", "0.005", and "0.02", respectively. Therefore, the AP attribute "book store" has the highest advertising effect, and the allocation unit 55 preferentially allocates an order request of the advertisement ID "O3" that specifies the AP attribute "book store" to the non-allocation user in which the distribution target ID is "F6". Note that the allocation unit 55 may allocate a non-allocation user to an order request selected on the basis of a relative ratio of the advertising effect.

As described above, the allocation unit 55 allocates a non-allocation user that can be allocated to a plurality of order requests to an order request that specifies a user attribute having a relatively high advertising effect. A non-allocation user having many user attributes is a valuable distribution stock, as described above, such a valuable non-allocation user is allocated to an order request having a high advertising effect. Accordingly, a non-allocation user can be appropriately allocated to an order request.

Note that the allocation unit 55 can determine an order request to be allocated to a non-allocation user on the basis of an allocation condition obtained by a combination of two or more of the first third conditions, as described above. For example, the allocation unit 55 can determine an order request to be allocated to a non-allocation user with a probability on the basis of a multiplication result of two or more of the relative ratio of the distribution unit price, the inverse of the relative ratio of the number of non-allocation users, and the relative ratio of the advertising effect.

Further, the allocation unit 55 may employ the first and third conditions as the allocation condition, and preferentially handle the first condition to the third condition, for example. In this case, the allocation unit 55 preferentially allocates a non-allocation user to an order request that specifies an attribute having a relatively high distribution unit price, and when the distribution unit prices are the same, the allocation unit 55 preferentially allocates a non-allocation user to an order request that specifies a relatively high advertising effect.

As described above, the allocation unit 55 can determine an order request to be allocated to a non-allocation user having a plurality of user attributes by the allocation condition that is a combination of two or more of the first to third conditions. Further, combinations of other conditions may be employed.

5. Processing Flow of Advertisement Distribution Management System 1

Figure 15:
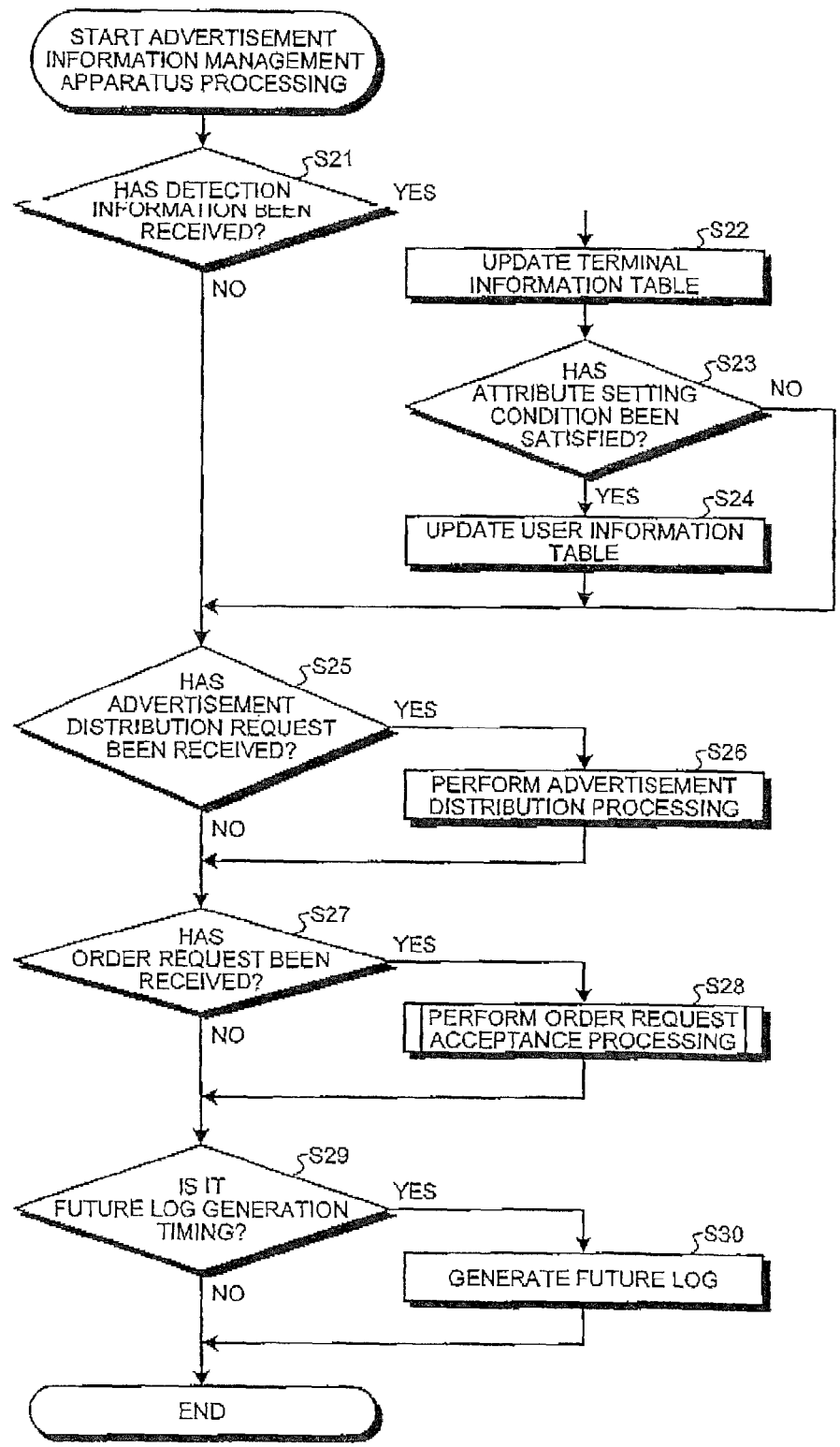
FIG. 15 is a flowchart of information processing in an advertisement distribution management apparatus.

Next, a procedure of advertisement distribution management processing by the advertisement distribution management system 1 according to the embodiment will be described. FIGS. 14 to 16 are diagrams for describing an information providing processing flow by the advertisement distribution management system 1. Hereinafter, processing of the wireless LAN access point 2 will be described with reference to FIG. 14, and processing of the advertisement distribution management apparatus 4 will be described with reference to FIGS. 15 and 16.

Processing of Wireless LAN Access Point 2

First, information processing of the wireless LAN access point 2 according to the embodiment will be described with reference to FIG. 14. FIG. 14 is a flowchart of information processing in the wireless LAN access point 2. The operation is processing repeatedly executed by the control unit 23 of the wireless LAN access point 2.

As illustrated in FIG. 14, the control unit 23 of the wireless LAN access point 2 determines whether having detected the wireless terminal 5 (step S10). In the processing, when having determined to have detected the wireless terminal 5 (Yes in step S10), the control unit 23 transmits detection information to the advertisement distribution management apparatus 4 through the WAN communication unit 22 (step S11).

In the processing of step S10, when having determined not to have detected the wireless terminal 5 (No in step S10), or when the processing of step S11 ends, the control unit 23 determines whether having received information from a device connected to the communication network 7 (hereinafter, described as WAN-side device) through the WAN communication unit 22 (step S12). When having determined to have received the information from the WAN-side device (Yes in step S12), the control unit 23 transfers the received information to the wireless terminal 5 that is the destination of the information (step S13).

In step S12, when having determined not to have received the information (No in step S12), or the processing of step S13 ends, the control unit 23 determines whether there is a request from the wireless terminal 5 to the WAN-side device (step S14). When having determined that there is a request from the wireless terminal 5 to the WAN-side device (Yes in step S14), the control unit 23 transfers the request from the wireless terminal 5 to the WAN-side device, to the WAN-side device through the WAN communication unit 22 (step S15).

When the processing of step S15 ends, or when having determined that there is no request from the wireless terminal 5 to the WAN-side device in step S14 (No in step S14), the control unit 23 terminates the processing. The control unit 23 can respectively execute the processing of steps S10 and S11, the processing of steps S12 and S13, and the processing of steps S14 and S15 by multitask processing, for example.

Processing of Advertisement Distribution Management Apparatus 4

Next, processing of the advertisement distribution management apparatus 4 will be described. FIG. 15 is a flowchart of information processing in the advertisement distribution management apparatus 4. The operation is processing repeatedly executed by the control unit 32 of the advertisement distribution management apparatus 4.

As illustrated in FIG. 15, the control unit 32 determines whether having received detection information from the wireless LAN access point 2 through the communication unit 30 (step S21). When having received the detection information (Yes in step S21), the control unit 32 updates the terminal information table on the basis of the received detection information (step S22).

Next, the control unit 32 determines whether there is a wireless terminal 5 that satisfies the attribute setting condition among the wireless terminals 5 set to the terminal information table on the basis of the terminal information table (step S23). When there is a wireless terminal 5 that satisfies the attribute setting condition (Yes in step S23), the control unit 32 updates the AP attribute corresponding to the user of the wireless terminal 5 that satisfies the attribute setting condition in the user information table (step S24).

In step S21, when having not received the detection information (No in step S21), when there is no wireless terminal 5 that satisfies the attribute setting condition in step S23 (No in step S23), or the processing of step S24 ends, the control unit 32 determines whether having accepted an advertisement distribution request from the wireless terminal 5 through the communication unit 30 (step S25).

When having received the advertisement distribution request (Yes in step S25), the control unit 32 selects advertising information from the advertising information table on the basis of information on the wireless terminal 5 that has requested the advertisement distribution (the terminal ID or the user ID), and performs advertisement distribution processing of transmitting the advertising information to the wireless terminal 5 as the requestor (step S26).

Meanwhile, when not having accepted the advertisement distribution request (No in step S25), or the processing of step S26 ends, the control unit 32 determines whether having received an order request of the advertisement distribution from the advertiser terminal 6 through the communication unit 30 (step S27). When having received the order request (Yes in step S27), the control unit 32 executes order request acceptance processing (step S28). The order request acceptance processing is the processing illustrated in steps S31 to S36 of FIG. 16, and details will be described below.

When having not received the order request in step S27 (No in step S27), or the processing of step S28 ends, the control unit 32 determines whether it becomes a future log generation timing (step S29). When it becomes the future log generation timing (Yes in step S29), the control unit 32 estimates a distribution target user to be the destination of the distribution in the predetermined future period to generates a future log on the basis of the user information table and the access log table, and sets the future log to the future log table (step S30).

When the processing of step S30 ends, or when it has not been the future log generation timing in step S29 (No in step S29), the control unit 32 terminates the processing.

Next, the order request acceptance processing of step S28 illustrated in FIG. 15 will be described. FIG. 16 is a flowchart of the order request acceptance processing illustrated in FIG. 15.

As illustrated in FIG. 16, in the order request acceptance processing, the control unit 32 determines whether accepting an order request from the advertiser terminal 6 on the basis of the future log set to the future log table (step S31). The control unit 32 counts the number of user attributes specified by the order request from among the user attributes of non-allocation user set to the future log table, for example, and determines to accept the order request when a count result is the number of distributions specified by the order request or more.

When accepting the order request from the advertiser terminal 6 (Yes in step S31), the control unit 32 sets information included in the order request to the advertising information table to update the advertising information table (step S32). Note that the user attribute, the distribution period, the number of distributions, the advertising information, and the like are included in the information included in the order request, and these pieces of information are set to the advertising information table.

Next, the control unit 32 performs allocation processing of the distribution target user (step S33). The allocation processing is processing of allocating the distribution target user having the user attribute specified by the order request to the order request.

Next, the control unit 32 updates the future log table on the basis of a result of the allocation processing of step S33 (step S34). To be specific, the control unit 32 sets an "allocation state" of the distribution target user allocated to the order request among the distribution target users set to the future log table to "1". Note that the "allocation state" of the distribution target user not to be allocated to the order request remains "0".

Following that, the control unit 32 transmits an order acceptance response to the advertiser terminal 6 through the communication unit 30 (step S35), and terminates the order request acceptance processing. Meanwhile, in step S31, when having determined not to accept the order request from the advertiser terminal 6 (No in step S31), the control unit 32 transmits an order refusal response to the advertiser terminal 6 through the communication unit 30 (step S36), and terminates the order request acceptance processing.

6. Modification

In the embodiment described above, an example in which the information on the AP type, the time, and the region is used as the attribute setting condition has been described. However, the attribute setting condition is not limited to the example. For example, the detection unit 52 may include, in the attribute setting condition, the fact of having accessed a site server through the wireless LAN access point 2 in the AP communication area. Further, the detection unit 52 may include temperature, humidity, weather, or the like in the attribute setting condition.

Further, the detection unit 52 acquires URL information on a page accessed through the wireless LAN access point 2 in the AP communication area from the wireless LAN access point 2, and causes the information on the page and the AP type to be associated with each other. For example, when the page accessed through the wireless LAN access point 2 to which the AP attribute "convenience store" is set is a page of "coffee", the allocation unit 55 has the AP attribute in which the AP type "convenience store" and the liking attribute of the user "coffee" are associated with each other. Accordingly, for example, a "user who likes coffee from among users who frequently come to convenience stores" can be made to the AP attribute.

Further, in the above-described embodiment, the user attribute specified in the order request transmitted from the advertiser terminal 6 has been used as the AP attribute. However, the user attribute can be specified in the order request by a combination of a plurality of AP attributes, a combination of the AP attribute and the demographic attribute, a combination of the AP attribute and the psychographic attribute, or the like.

Further, the above-described embodiment has been given on the assumption that the target period in which the destination of the future advertisement distribution is predicted and the distribution period of the order request are the same for easy understanding of the description. However, the target period in which the destination of the future advertisement distribution is predicted and the distribution period of the order request may not be the same, and the target period in which the destination of the future advertisement distribution is predicted may be by days, and the distribution period of the order request may be set by days. Further, a part of the target period in which the destination of the future advertisement distribution is predicted may be the distribution period of the order request.

Further, in the above-described embodiment, the URL of the advertising information is used as the URL of the advertisement distribution management apparatus 4. However, the URL of the advertising information may be a URL of the information distribution apparatus 3. In this case, the wireless terminal 5 requests the advertising information to the information distribution apparatus 3 on the basis of the URL of the advertising information. When having received the request, the information distribution apparatus 3 transmits a request of the advertising information to the advertisement distribution management apparatus 4. The advertisement distribution management apparatus 4 transmits the advertising information corresponding to the request transmitted from the information distribution apparatus 3 to the information distribution apparatus 3.

7. Effects

In the advertisement distribution management system 1 according to the embodiment, the detection unit 52 (corresponding to an example of a detection unit) detects the wireless terminal 5 that exists in the communication area of the wireless LAN access point 2, and satisfies the predetermined condition, the acceptance unit 54 (corresponding to an example of an acquisition unit) acquires the order request that satisfies a user attribute and the number of distributions, the storage unit 31 (an example of a storage unit) stores the future log table in which information on the wireless terminal 5 detected by the detection unit 52 and information on the AP attribute set to the wireless LAN access point 2 are associated with each other, and the acceptance unit 54 (corresponding to an example of a detection unit) accepts the order request of an advertisement distribution that specifies the information on the AP attribute on the basis of the information on the wireless terminal 5 stored in the user information DB 43 in association with the information on the specified AP attribute.

With such a configuration, an order request of an advertisement distribution can be accepted using information according to an installation location of the wireless LAN access point 2 as a user attribute, and an attribute corresponding to an actual behavior of the user can be provided to the advertisement as a target. Accordingly, a new attribute that has not existed before can be provided as a target, and an attraction of the advertisement distribution service to the advertiser can be improved.

Further, the information on the AP attribute includes first attribute information set to a unit of the wireless LAN access point 2 and second attribute information set to a unit of a group of two or more of the wireless LAN access points 2, and, the user information DB 43 stores the first attribute information and the second attribute information in association with the information on the wireless terminal 5.

With such a configuration, not only a user attribute according to the installation location of one wireless LAN access point 2, but also user attributes according to regions in which a plurality of wireless LAN access points 2 are installed can be used as destinations of an advertisement distribution. Accordingly, detailed demand from the advertiser can be appropriately handled while an effective advertisement distribution can be realized at the advertiser side, while customers can be increased due to improvement of the services, and the rise in revenue can be realized at the advertisement distribution service provider side.

Further, the future log prediction unit 53 (an example of a setting unit) sets the distribution target user predicted as the destination of the future advertisement distribution on the basis of the information on the wireless terminal 5 stored in the user information DB 43, the allocation unit 55 (an example of an allocation unit) allocates the distribution target user set by the future log prediction unit 53 to the order request, and the acceptance unit 54 accepts a new order request on the basis of the distribution target user not allocated to an order request by the allocation unit 55 among the distribution target user set by the future log prediction unit 53.

With such a configuration, the distribution target user can be allocated to the accepted order request, and the distribution target user (the distribution stock) can be appropriately managed.

Further, a distribution unit price is set to the AP attribute as information on a value with respect to an advertisement distribution, and the allocation unit 55 preferentially allocates the distribution target user that is associated with a plurality of AP attributes to a new order request that specifies an AP attribute having a relatively high distribution unit price among the plurality of AP attributes.

Since a non-allocation user having many user attributes can be allocated to many order requests, the non-allocation user is a valuable distribution stock, and such a valuable non-allocation user can be allocated to an order request that specifies an AP attribute having a high distribution unit price. Accordingly, a non-allocation user can be appropriately allocated to an order request.

Further, the allocation unit 55 preferentially allocates the distribution target user that is associated with the plurality of AP attributes to an order request that specifies an AP attribute in which the number of non-allocation users is relatively small among the plurality of AP attributes.

The non-allocation user having a small number of user attributes is a valuable distribution stock, and such a non-allocation user can be allocated to an order request that specifies an AP attribute in which the number of non-allocation users is relatively small. Accordingly, a non-allocation user can be appropriately allocated to an order request.

Further, the storage unit 31 stores the attribute information table in which the AP attribute and the advertising effect with respect to the advertisement distribution that specifies the AP attribute are associated with each other, and the allocation unit 55 preferentially allocates the distribution target user that is associated with a plurality of AP attributes to an order request that specifies an AP attribute having a relatively high advertising effect among the plurality of AP attributes.

The non-allocation user having a large number of user attributes is a valuable distribution stock, and such a non-allocation user can be allocated to an order request having a high advertising effect. Accordingly, a non-allocation user can be appropriately allocated to an order request.

Further, the detection unit 52 accepts an order request counting a combination of two or more user attributes in which the frequency of being specified in order requests of an advertisement distribution as a single user attribute.

With such a configuration, an order request that specifies a user attribute by a combination of two or more user attributes in which the frequency of being specified in order requests is a threshold or more can be accepted. Therefore, a possibility of acceptance of an order of a future advertisement distribution can be increased, and a loss of sales opportunity can be suppressed.

Further, when the radio wave intensity of the wireless terminal 5 and/or the stay time of the wireless terminal 5 is/are predetermined threshold(s) or more, the detection unit 52 determines the wireless terminal 5 satisfies a predetermined condition.

With such a configuration, an attribute according to an installation location of the wireless LAN access point 2 can be accurately detected.

Further, when the time period in which the wireless terminal 5 has been detected and the number of detection times satisfy predetermined conditions, the detection unit 52 determines the wireless terminal 5 satisfies a predetermined condition.

With such a configuration, an attribute according to an installation location of the wireless LAN access point 2 can be accurately detected.

8. Others

The above-described advertisement distribution management apparatus 4 may be realized by a plurality of server computers, and the configuration can be flexibly changed depending on a function by being realized by calling an outside platform or the like by an application programming interface (API), network computing, or the like. Further, the information distribution apparatus 3 and the advertisement distribution management apparatus 4 may be realized by a single server computer.

According to one aspect of an embodiment, an advertisement distribution management apparatus and an advertisement distribution management method capable of accepting an order request of an advertisement distribution with attribute information on the basis of an actual behavior of the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement distribution management apparatus comprising:
   a network interface that communicates with wireless terminals and a wireless LAN access point via a network;
   a memory storing a first database, a second database and a third database, and
   a processor operatively coupled to the memory, the processor being programmed to:
      acquire information on the wireless terminals sent from the wireless LAN access point via the network;
      detect that the wireless terminals exist in a communication area of the wireless LAN access point and satisfy a predetermined condition based on the information on the wireless terminals sent from the wireless LAN access point, the predetermined condition including a condition in which the wireless terminals have accessed an information providing apparatus via the wireless LAN access point;
      store, in the first database, information on each of the detected wireless terminals and attribute information of the wireless LAN access point in association with each other;
      store, in the second database, information on a plurality of distribution target users associated with the stored attribute information of the wireless LAN access point;
      receive a new advertisement distribution order request specifying a desired attribute information and a number of advertisement distributions via the network; and
      accept the new advertisement distribution order request based on:
         a comparison between: (A) the number of the advertisement distributions specified by the new advertisement distribution order request, and (B) a number of distribution target users that are associated with attribute information matching the desired attribute information of the wireless LAN access point and are not allocated to a past advertisement distribution order request among the plurality of distribution target users, and
         a combination of two or more pieces of attribute information of which a designation frequency in past order requests of advertisement distributions is a threshold or more as a single piece of attribute information, wherein the attribute information is determined based on the wireless terminals in communication with the wireless LAN access point;
      store, in the third database, pieces of advertisement information including advertisement information included in the received new advertisement distribution order request;
      receive a distribution request of the advertisement information from one of the wireless terminals via the network;
      in response to receiving the distribution request of the advertisement information, acquire, from the third database, a piece of advertisement information according to the attribute information of the wireless LAN access point stored in the first database in association with the one wireless terminal among the pieces of advertisement information; and
      transmit the acquired piece of advertisement information to the one wireless terminal to display the acquired piece of advertisement information in a space of a webpage displayed on the one wireless terminal.

2. The advertisement distribution management apparatus according to claim 1, wherein
   the attribute information includes first attribute information set to a unit of the wireless LAN access point and second attribute information set to a unit of a group of two or more of the wireless LAN access points, and
   the memory stores the first attribute information and the second attribute information in association with the information on the wireless terminal.

3. The advertisement distribution management apparatus according to claim 1, wherein the processor is programmed to:
allocate the associated distribution target users to the new advertisement distribution order request.

4. The advertisement distribution management apparatus according to claim 3, wherein
information on a distribution unit price is set to the attribute information, and
the processor is programmed to allocate the distribution target user in association with a plurality of pieces of the attribute information to a new advertisement distribution order request that specifies attribute information in which the distribution unit price is relatively high among the plurality of pieces of the attribute information.

5. The advertisement distribution management apparatus according to claim 3, wherein
the processor is programmed to allocate the distribution target user in association with the plurality of pieces of the attribute information to a new advertisement distribution order request that specifies attribute information in which a number of distribution target users not allocated to the order request is relatively small among the plurality of pieces of the attribute information.

6. The advertisement distribution management apparatus according to claim 3, wherein
the memory stores the attribute information and information on an advertising effect with respect to the advertisement distribution that specifies the attribute information in association with each other, and
the processor is programmed to allocate the distribution target user in association with the plurality of pieces of the attribute information to an order request that specifies attribute information in which the associated advertising effect is relatively high among the plurality pieces of attribute information.

7. The advertisement distribution management apparatus according to claim 1, wherein the processor is programmed to determine that the wireless terminal satisfies the predetermined condition when a radio wave intensity and/or a stay time of the wireless terminal is a predetermined threshold or more.

8. The advertisement distribution management apparatus according to claim 1, wherein the processor is programmed to determine that the wireless terminal satisfies the predetermined condition when a time period and/or a number of times in which the detected wireless terminal is present within the communication area of the wireless LAN access point.

9. The advertisement distribution management apparatus according to claim 8, wherein the time period is determined by comparing: (i) an entrance time of the wireless terminal into the communication area of the wireless LAN access point, and (ii) a current time of the wireless terminal in the communication area of the wireless LAN access point.

10. The advertisement distribution management apparatus according to claim 1, wherein the processor stores in a fourth database of the memory information on users who send a distribution request of advertisement information via the network, and updates the plurality of distribution target users based on the information on the users stored in the fourth database.

11. The advertisement distribution management apparatus according to claim 1, wherein the processor acquires information on URL of a webpage accessed by the one wireless terminal via the wireless LAN access point, and stores in the first database information on the one wireless terminal, information on the URL of the accessed webpage, and the attribute information of the wireless LAN access point in association with one another.

12. The advertisement distribution management apparatus according to claim 1, wherein
the processor divides the combination of the two or more pieces of attribute information into two or more pieces of attribute information, when:
the number of the distribution target users not allocated to the past advertisement distribution order request is equal to or less than a predetermined value, or
a number of distribution target users not allocated to the past advertisement distribution order request and having the combination of the two or more pieces of attribute information is equal to or less than a predetermined value.

13. An advertisement distribution management method executed by a computer having: (i) a memory storing a first database, a second database and a third database, and (ii) a network interface that communicates with wireless terminals and a wireless LAN access point via a network, the advertisement distribution management method comprising:
acquiring information on the wireless terminals sent from the wireless LAN access point via the network;
detecting that the wireless terminals exist in a communication area of the wireless LAN access point and satisfy a predetermined condition based on the information on the wireless terminals sent from the wireless LAN access point, the predetermined condition including a condition in which the wireless terminals have accessed an information providing apparatus via the wireless LAN access point;
storing, in the first database, information on the detected wireless terminal and attribute information set to the wireless LAN access point in association with each other;
storing, in the second database, information on a plurality of distribution target users associated with the stored attribute information of the wireless LAN access point;
receiving a new advertisement distribution order request specifying a desired attribute information and a number of advertisement distributions via the network; and
accepting the new advertisement distribution order request based on
a comparison between: (A) the number of the advertisement distributions specified by the new advertisement distribution order request, and (B) a number of distribution target users that are associated with attribute information matching the desired attribute information of the wireless LAN access point and are not allocated to a past advertisement distribution order request among the plurality of distribution target users, and
a combination of two or more pieces of attribute information of which a designation frequency in past order requests of advertisement distributions is a threshold or more is accepted as a single piece of attribute information, wherein the attribute information is determined based on the wireless terminals in communication with the wireless LAN access point;
storing, in the third database, pieces of advertisement information including advertisement information included in the received new advertisement distribution order request;

receiving a distribution request of the advertisement information from one of the wireless terminals via the network;

in response to receiving the distribution request of the advertisement information, acquiring, from the third database, a piece of advertisement information according to the attribute information of the wireless LAN access point stored in the first database in association with the one wireless terminal among the pieces of advertisement information; and transmitting the acquired piece of advertisement information to the one wireless terminal to display the acquired piece of advertisement information in a space of a webpage displayed on the one wireless terminal.

14. The advertisement distribution management method according to claim 13, wherein the wireless terminal satisfies the predetermined condition when a radio wave intensity and/or a stay time of the wireless terminal is a predetermined threshold or more.

15. The advertisement distribution management method according to claim 13, wherein the wireless terminal satisfies the predetermined condition when a time period and/or a number of times in which the detected wireless terminal is present within the communication area of the wireless LAN access point.

16. The advertisement distribution management method according to claim 15, wherein the time period is determined by comparing: (i) an entrance time of the wireless terminal into the communication area of the wireless LAN access point, and (ii) a current time of the wireless terminal in the communication area of the wireless LAN access point.

17. The advertisement distribution management apparatus according to claim 1, wherein the attribute information of the wireless LAN access point is set based on attributes corresponding to a location of the wireless LAN access point.

18. The advertisement distribution management method according to claim 13, wherein the attribute information of the wireless LAN access point is set based on attributes corresponding to a location of the wireless LAN access point.

* * * * *